United States Patent [19]
Kita et al.

[11] Patent Number: 5,481,401
[45] Date of Patent: Jan. 2, 1996

[54] ULTRAVIOLET MICROSCOPE

[75] Inventors: Nobuhiro Kita; Shingo Kashima; Kazuo Shimizu, all of Tokyo, Japan

[73] Assignee: Olympus Optical Co., Ltd., Tokyo, Japan

[21] Appl. No.: 290,172

[22] Filed: Aug. 15, 1994

Related U.S. Application Data

[63] Continuation of Ser. No. 882,280, May 13, 1992, abandoned.

[30] Foreign Application Priority Data

May 16, 1991 [JP] Japan ..................... 3-111894
May 7, 1992 [JP] Japan ..................... 4-114922

[51] Int. Cl.$^6$ .............................................. G02B 5/30
[52] U.S. Cl. .......................... 359/353; 359/355; 359/363; 359/369; 359/372; 359/380
[58] Field of Search .................... 359/350, 353, 359/354, 355, 363, 368, 369, 372, 385, 464, 618, 634, 629, 380; 250/365, 368, 372

[56] References Cited

U.S. PATENT DOCUMENTS

| | | | |
|---|---|---|---|
| Re. 33,883 | 4/1992 | Ledley | 359/368 |
| 3,124,682 | 3/1964 | Kojima et al. | 359/363 |
| 4,751,571 | 6/1988 | Lillquist | 359/350 |
| 4,771,020 | 9/1988 | Omata et al. | 501/42 |
| 4,786,155 | 11/1988 | Fantone et al. | 359/377 |
| 4,911,543 | 3/1990 | Hodgson | 359/369 |
| 4,961,636 | 10/1990 | Gaul et al. | 359/381 |
| 5,103,341 | 4/1992 | Ulrich et al. | 359/354 |
| 5,144,475 | 9/1992 | Hayashi | 359/355 |
| 5,260,578 | 11/1993 | Bliton et al. | 359/350 |
| 5,260,825 | 11/1993 | Nagano et al. | 359/368 |
| 5,307,202 | 4/1994 | Martino et al. | 359/369 |

FOREIGN PATENT DOCUMENTS

| | | | |
|---|---|---|---|
| 61-189515 | 8/1986 | Japan | G02B 21/06 |
| 64-62609 | 3/1989 | Japan | G02B 21/16 |
| WO9218850 | 10/1992 | WIPO | G01N 21/64 |

*Primary Examiner*—Paul M. Dzierzynski
*Assistant Examiner*—John Juba, Jr.
*Attorney, Agent, or Firm*—Frishauf, Holtz, Goodman, Langer & Chick

[57] ABSTRACT

Light from a mercury lamp is focused by an objective lens system and is incident on a specimen to be examined. A focusing optical path of light reflected by the specimen is split into an optical path of an ultraviolet ray and an optical path of visible light by a dichroic mirror having wavelength selectivity. The ultraviolet ray is guided to an ultraviolet CCD camera. The ultraviolet CCD camera supplies a monochrome picture signal to a monochrome display through a first picture processor. On the other hand, the visible light is guided to a color CCD camera. The color CCD camera supplies a color picture signal to a color display through a second picture processor. Therefore, an ultraviolet picture of the specimen is displayed on the monochrome display at a high resolving power and a large magnification. At the same time, a color picture of the specimen is displayed on the color display.

19 Claims, 14 Drawing Sheets

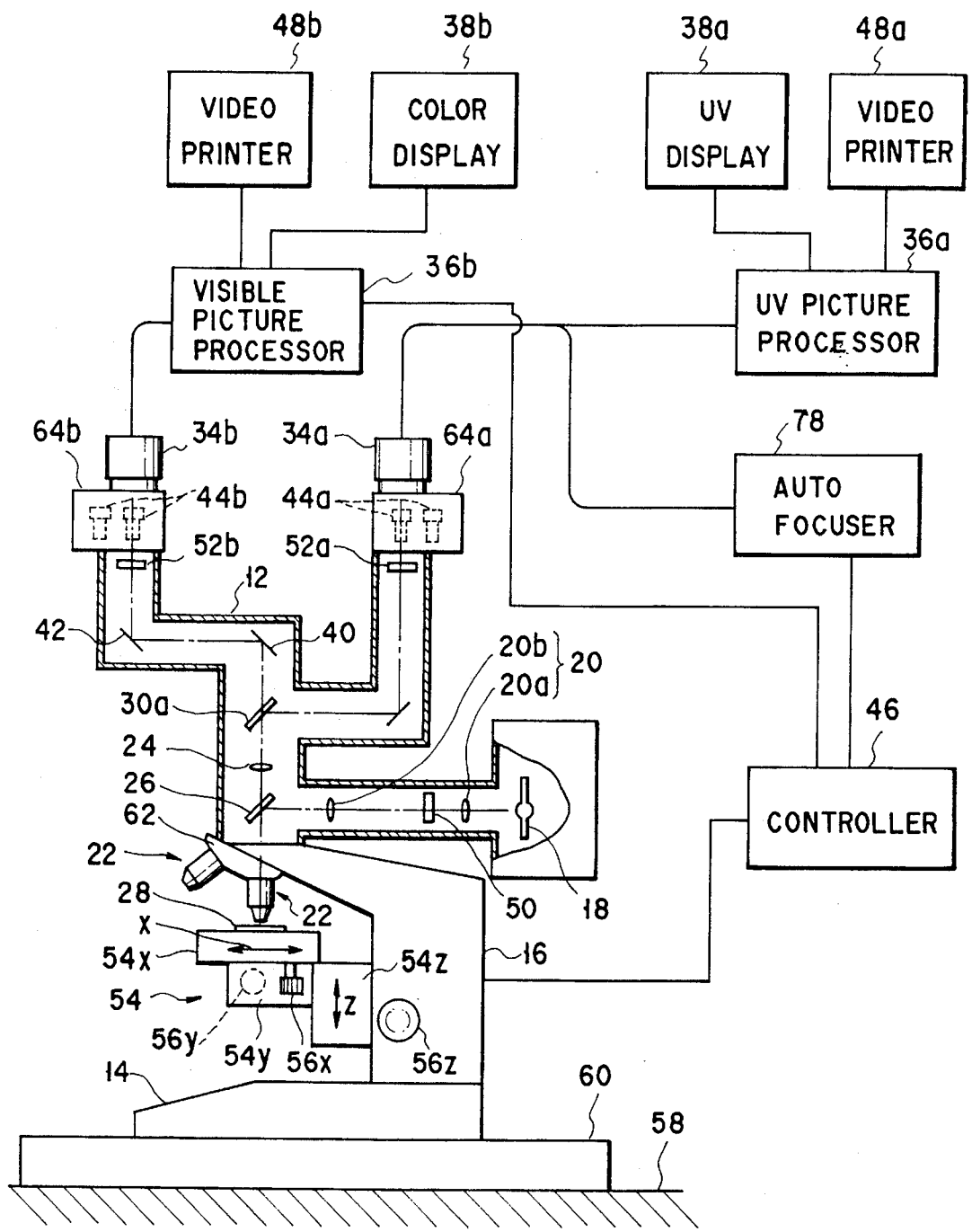
F I G. 1

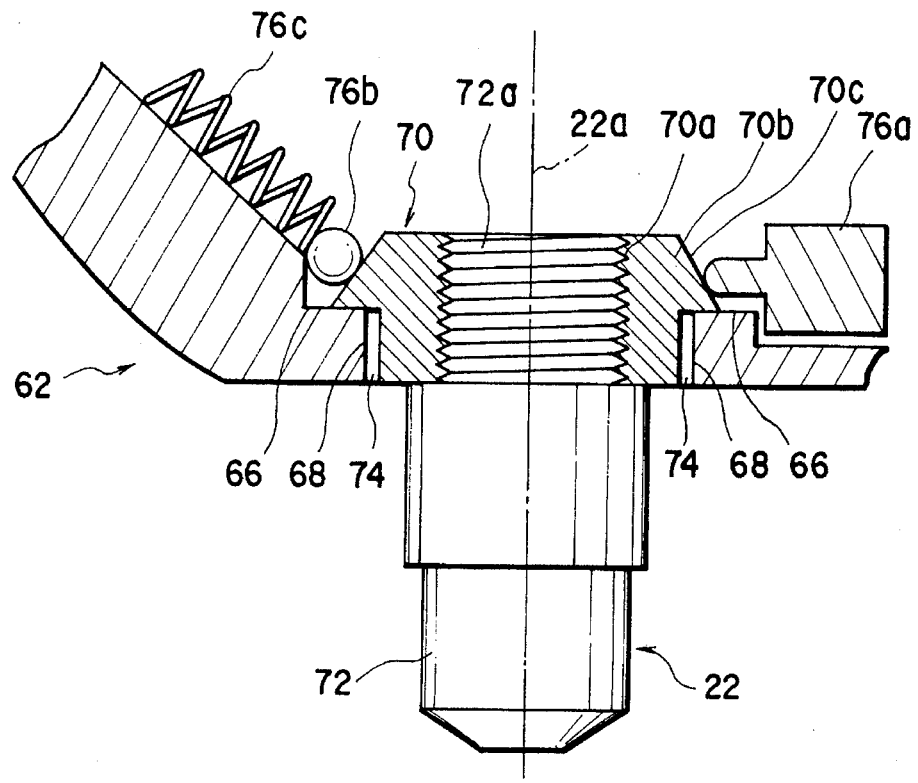
F I G. 2
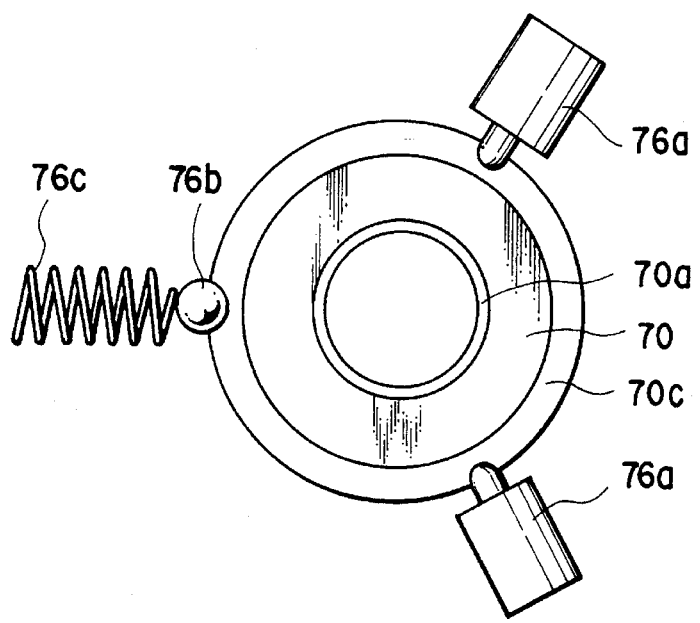
F I G. 3

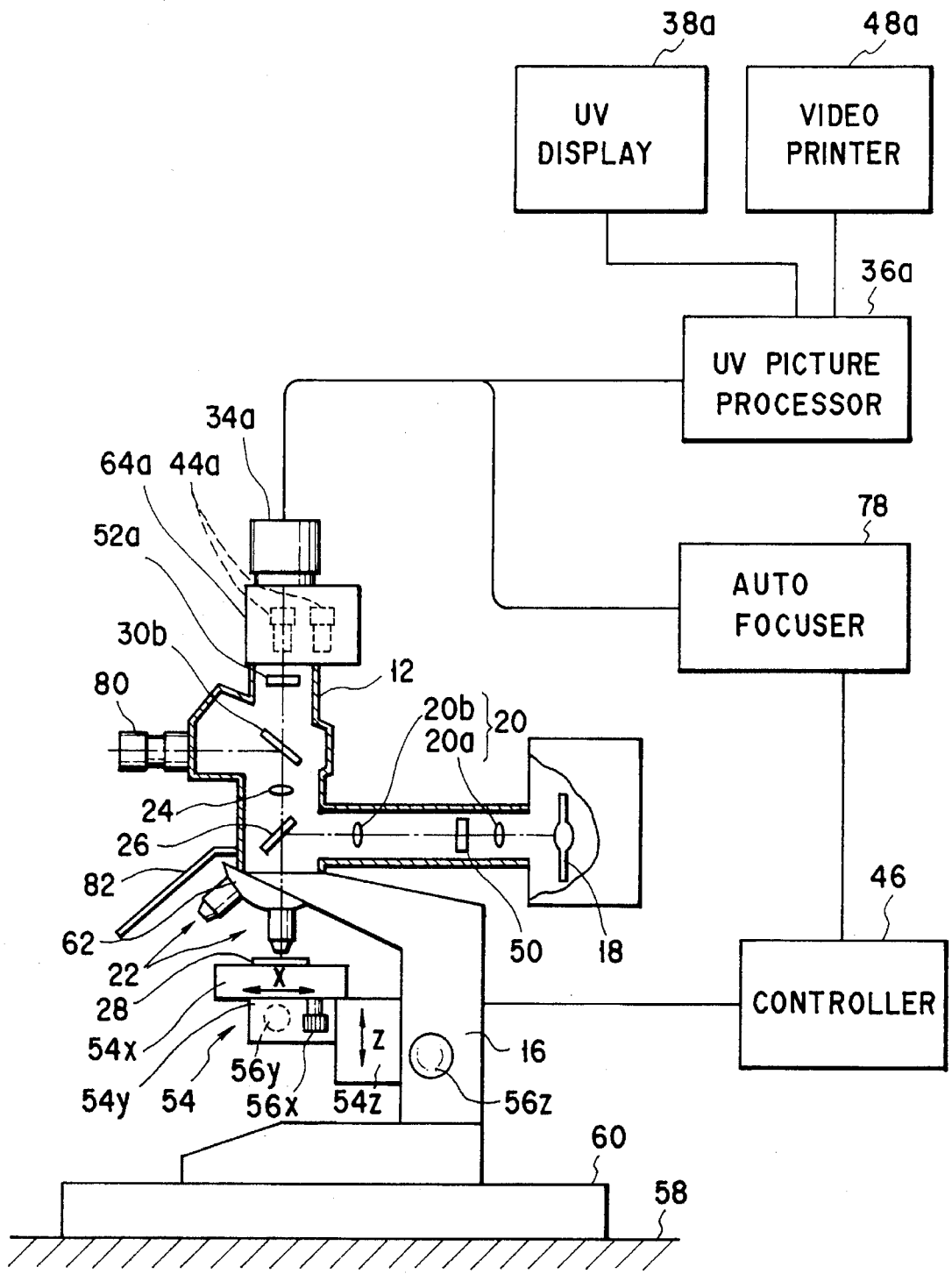
F I G. 4

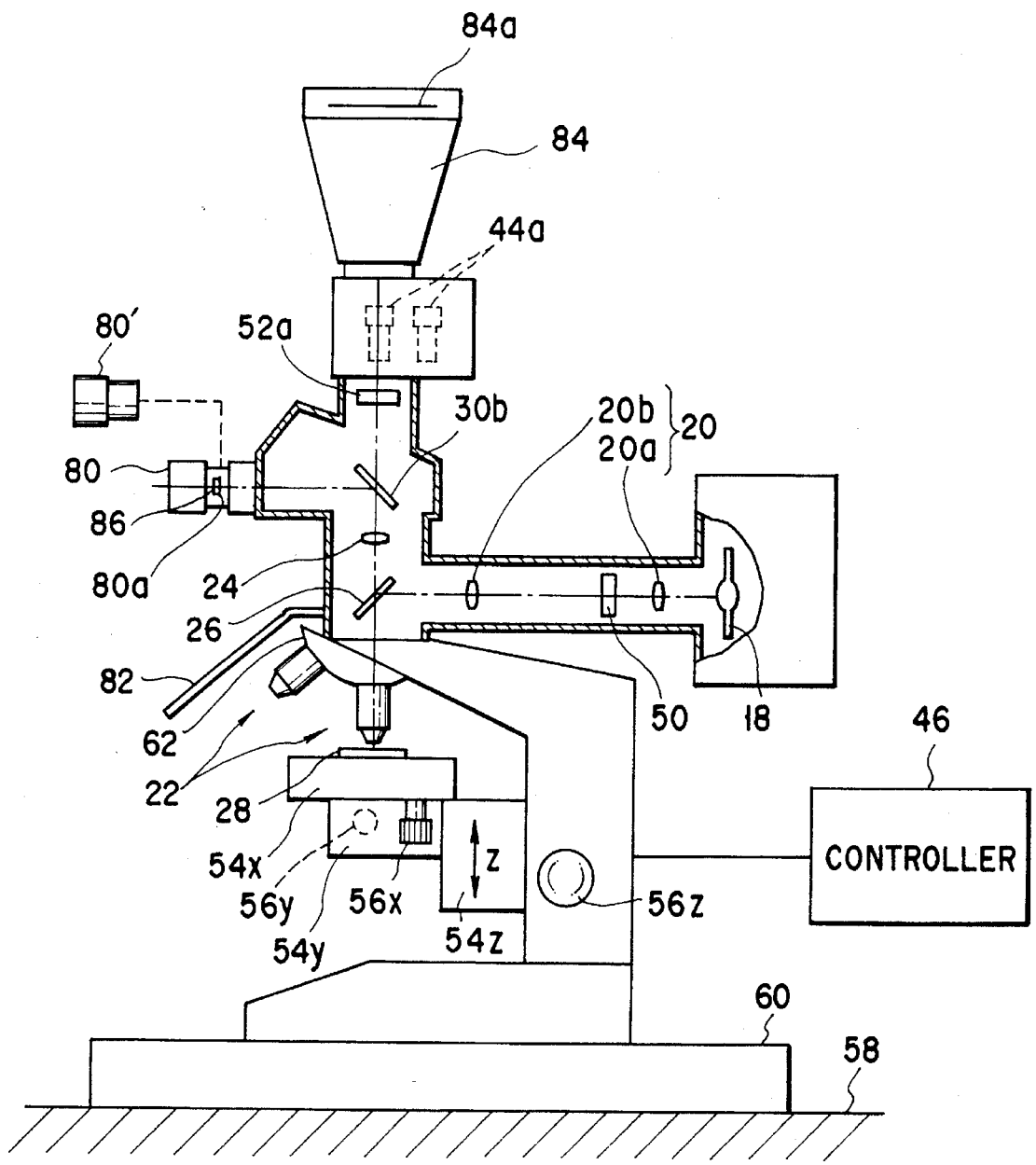
F I G. 5

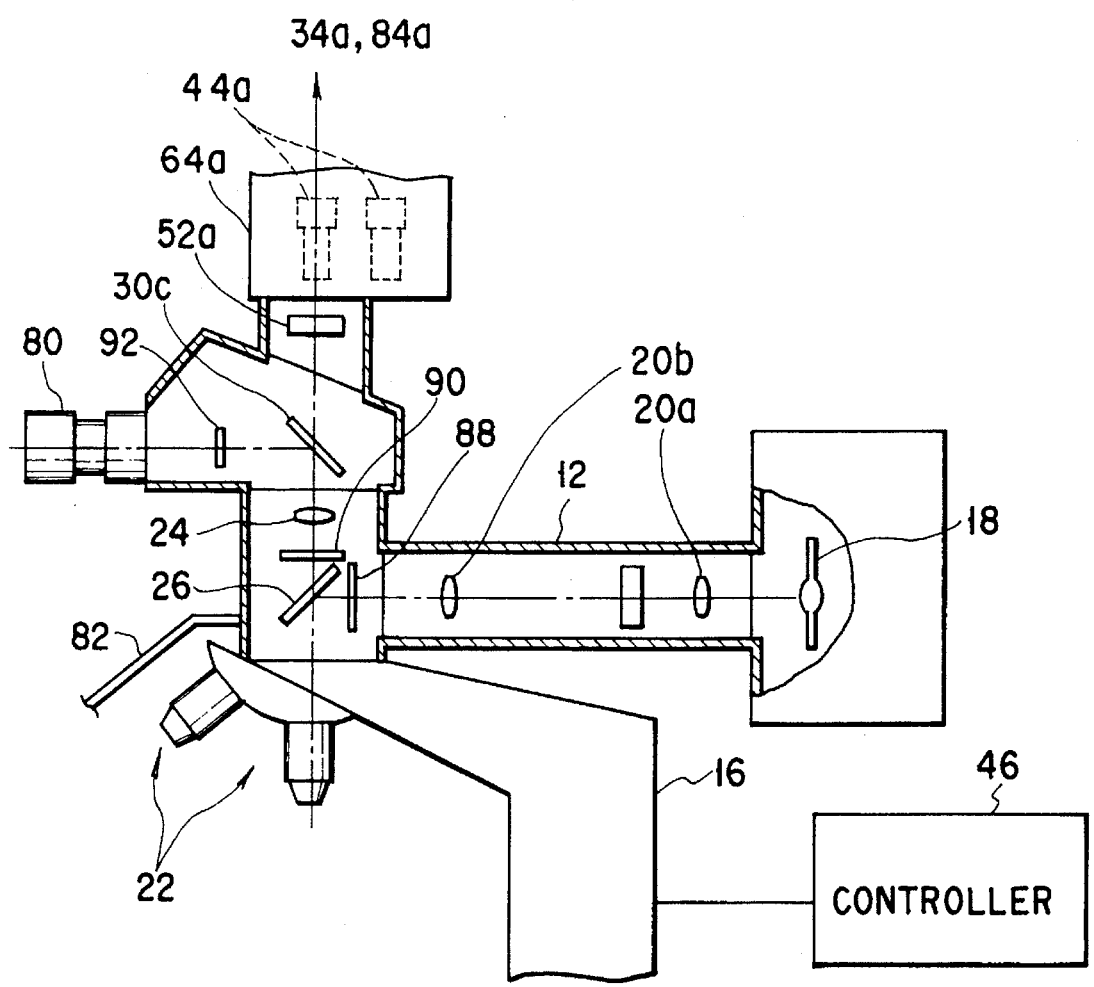
F I G. 6

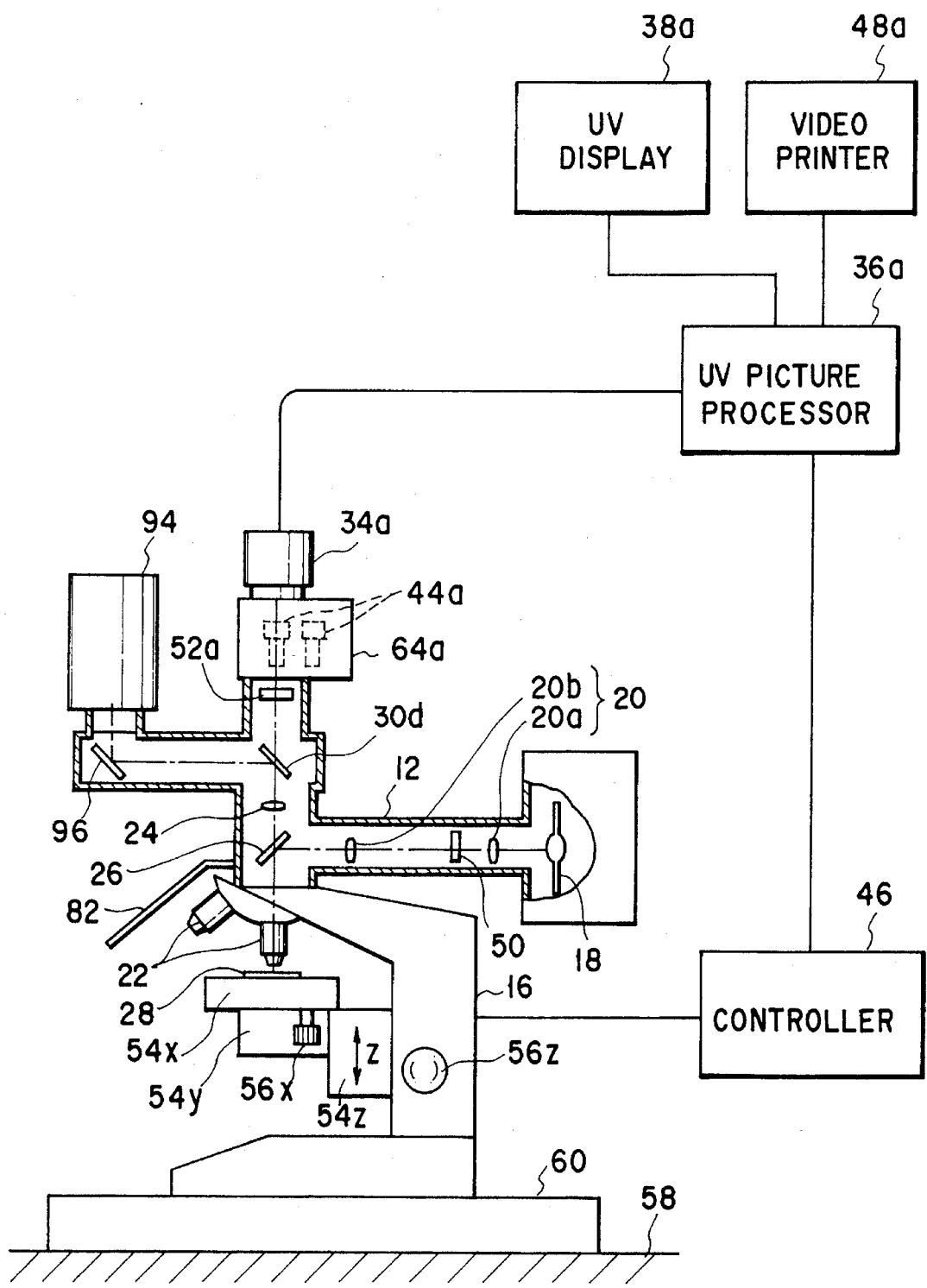
F I G. 7

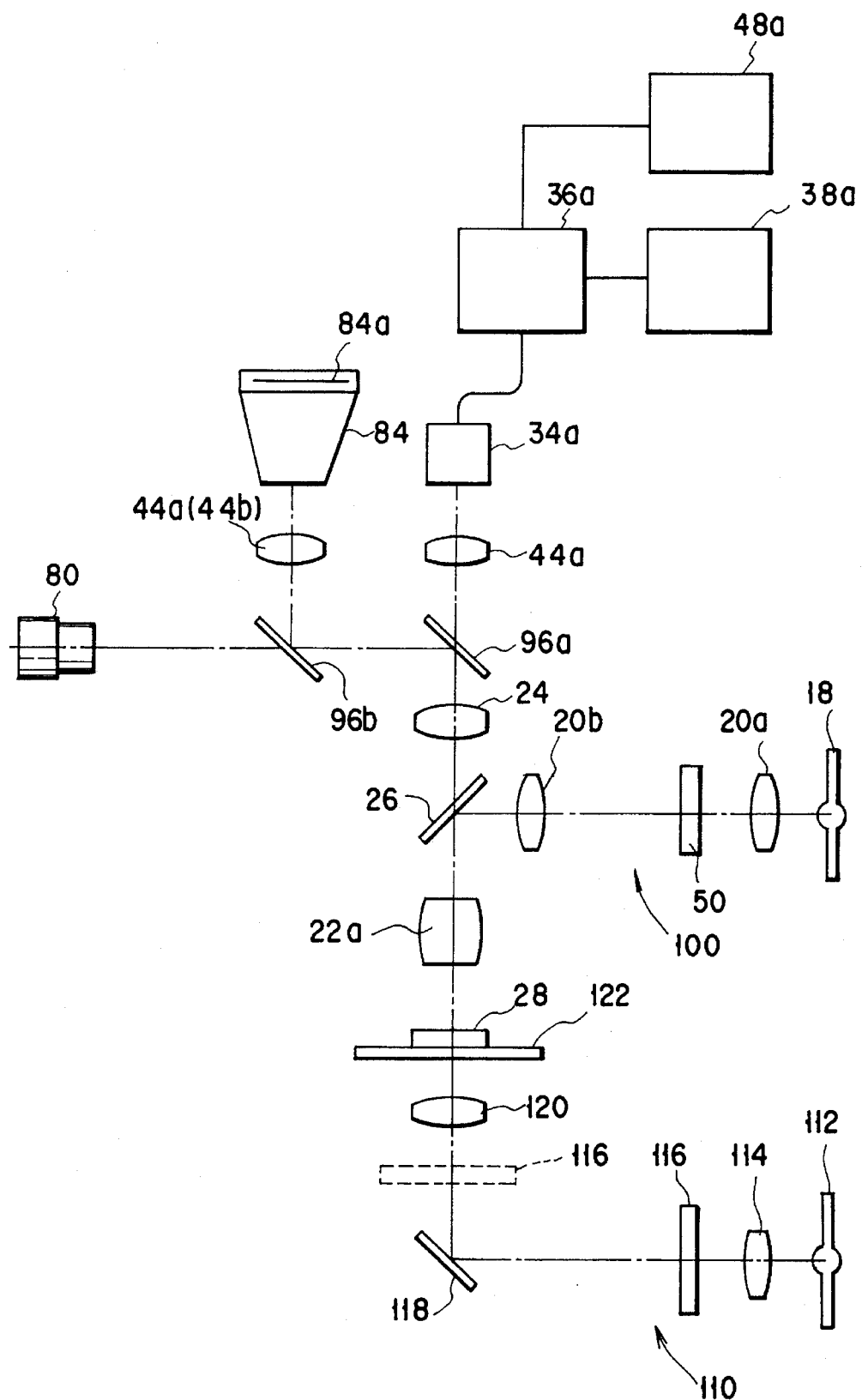
F I G. 8

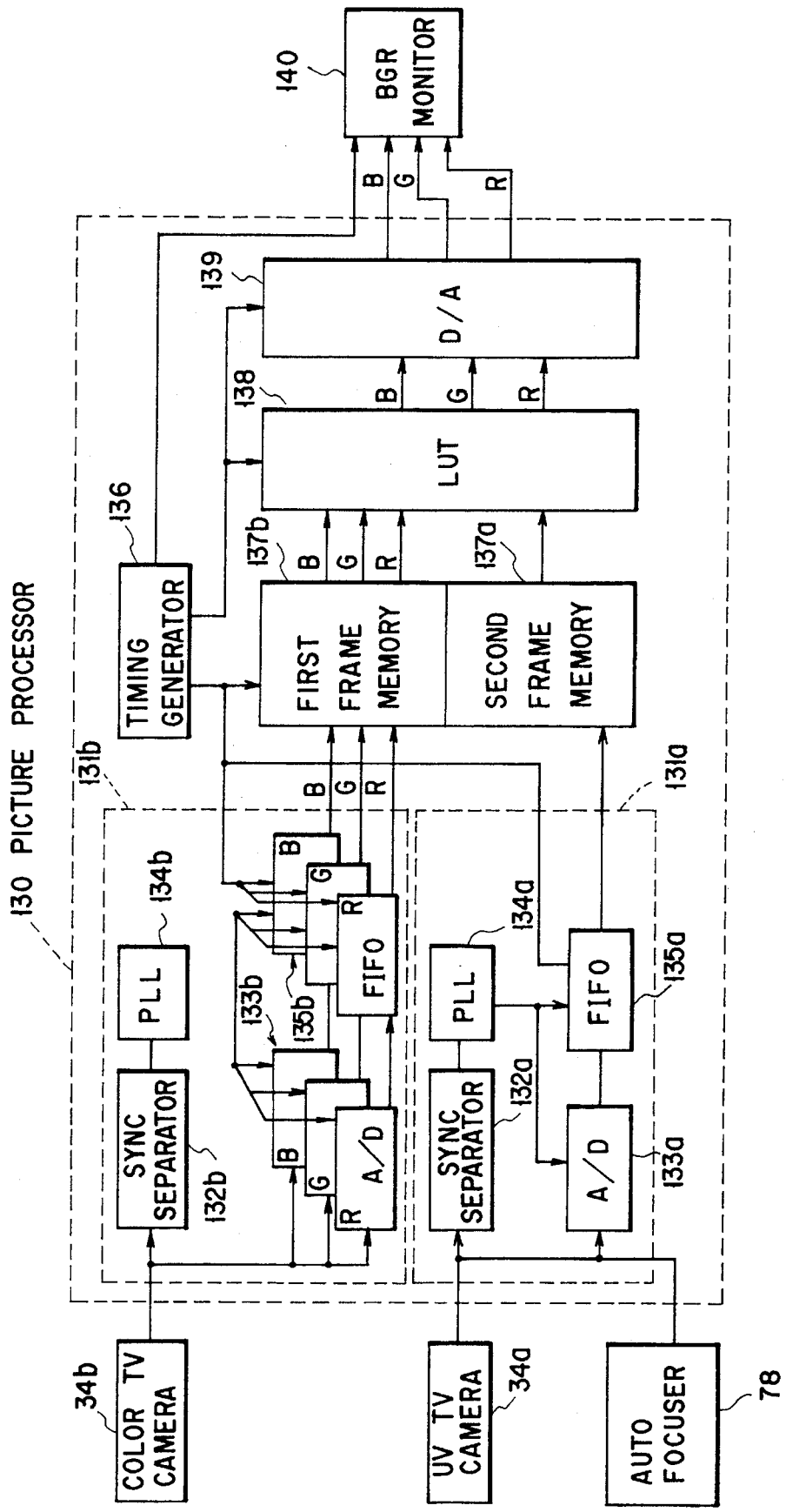
F I G. 10

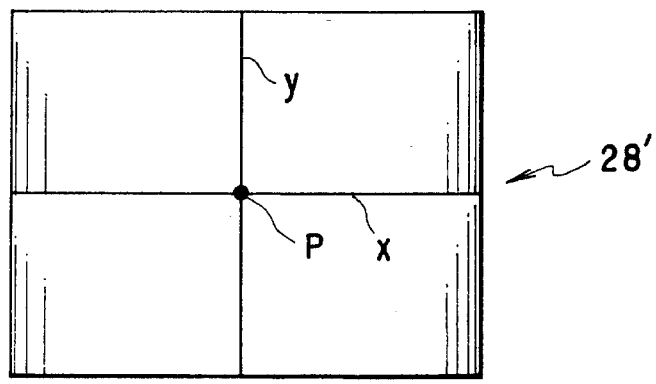
F I G. 14
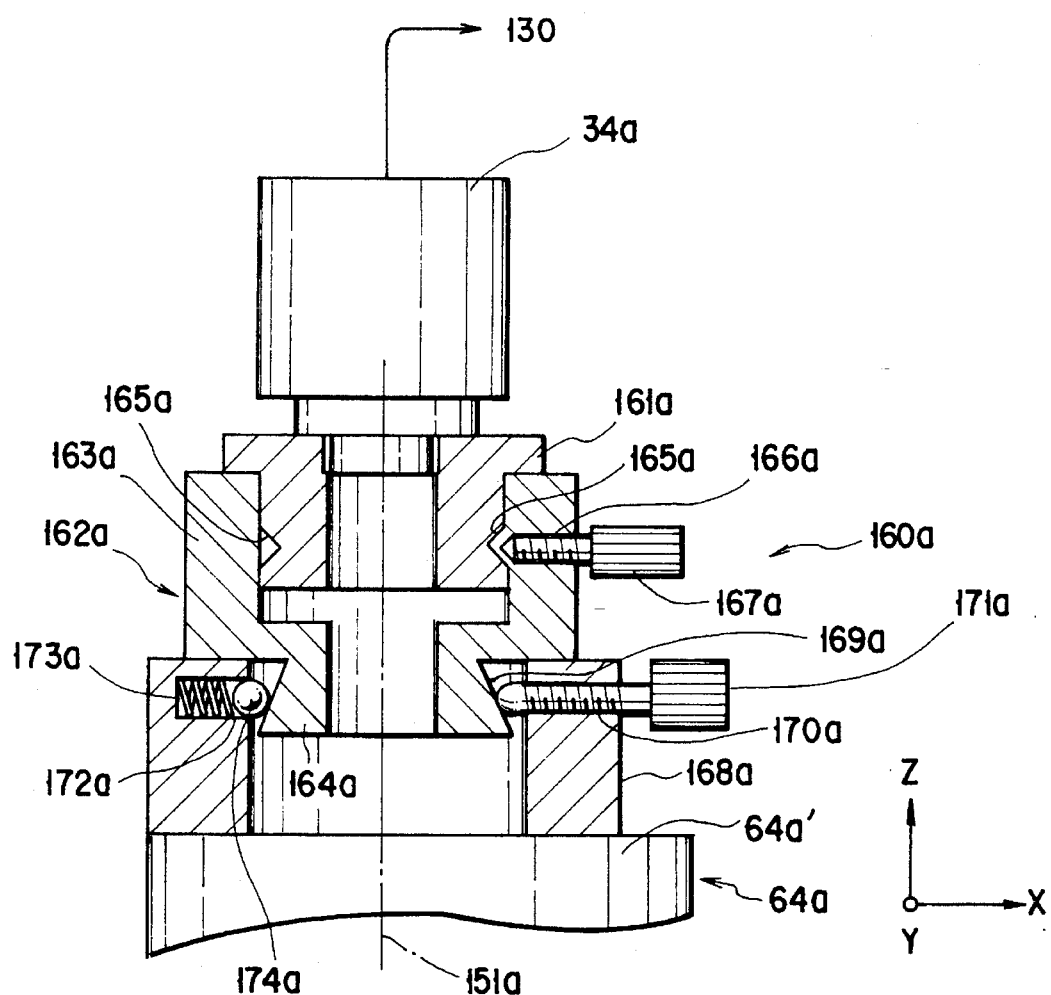
F I G. 15

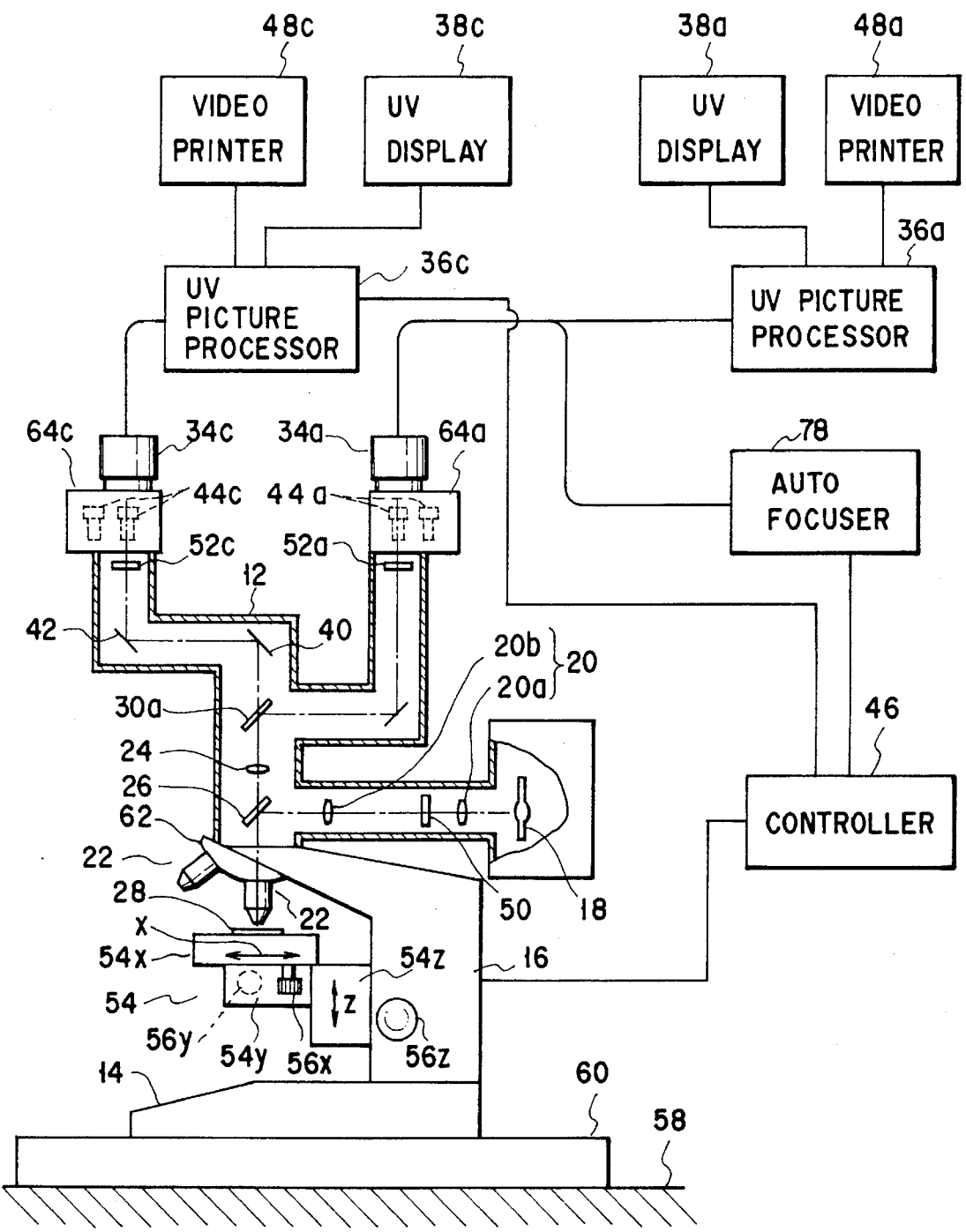
F I G. 16

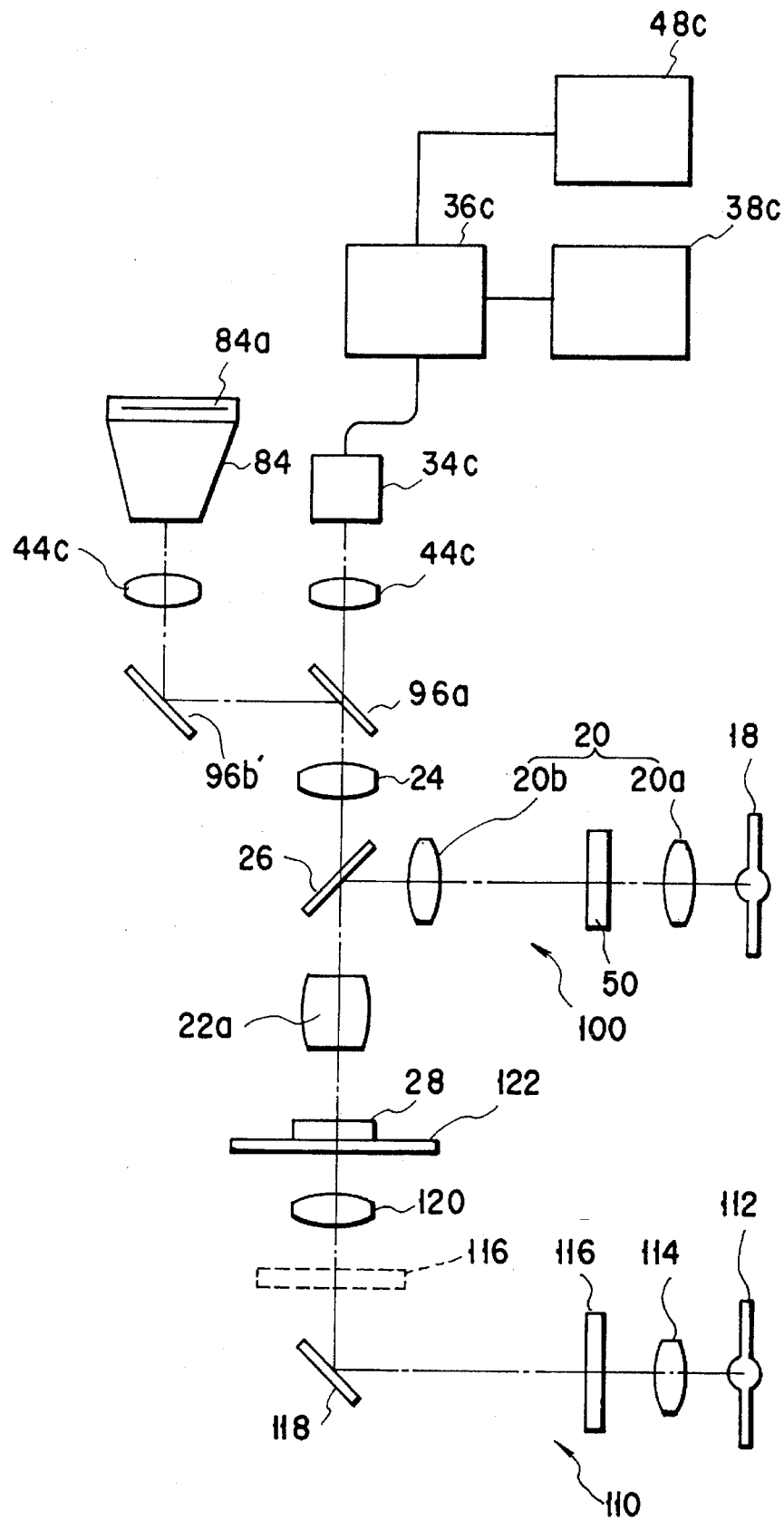
F I G. 17

ULTRAVIOLET MICROSCOPE

This application is a continuation of application Ser. No. 07/882,280, filed May 13, 1992, now abandoned.

BACKGROUND OF THE INVENTION

1. Field of the Invention

The present invention generally relates to the field of ultraviolet microscopes. More particularly, the present invention relates to a microscope for observing a specimen in a wavelength range from a visible range to an ultraviolet range, a microscope for superposing an ultraviolet picture of a specimen on a visible color picture thereof and displaying a superposed picture, and a microscope for observing only an ultraviolet image of a specimen.

2. Description of the Related Art

In a lithographic process for semiconductor devices, an exposed state of a semiconductor device is observed in a microscopic examination. In a test using an optical microscope with a visible light source, a structure having a size of 0.8 μm or more can be observed, and interference colors of a resist film can be tested.

A scanning electron microscope (SEM) and an ultraviolet microscope are used to observe microstructures.

Along with the recent developments of micropatterning techniques, the structures of semiconductor devices tend to be further miniaturized. For example, in a 16-Mbyte dynamic type random-access memory (RAM), a line width is about 0.5 μm. Since a resolving power of an optical microscope is insufficiently low for micropatterned devices, measurement of line widths and detection of defects cannot be performed. On the other hand, although an SEM and an ultraviolet microscope have sufficiently high resolving powers, pictures to be displayed are only monochrome pictures. Color information which is one of the most important test factors cannot be obtained. In addition, a vacuum atmosphere is required in the SEM during observation, thus complicating the operations.

The limit of the resolving power of the optical microscope depends on the wavelength of light from a light source used together with the optical microscope. A wavelength λ of light used in an optical microscope is generally fixed to an average wavelength (i.e., 550 nm) of visible light as a peak of spectral luminous efficiency of a human eye. In this manner, when the wavelength λ is determined to be the fixed value, a numerical aperture NA of an objective lens system must be increased to decrease a resolving power ε of the optical microscope, as can be apparent from the following equation:

$$\epsilon = K \cdot \lambda / NA \qquad (i)$$

(where K is a proportional constant of 1 or less, λ is the wavelength of light, NA is the numerical aperture of the objective lens system).

In a visible light microscope having a large magnification, an immersion objective lens system is particularly used to increase the numerical aperture NA of the objective lens system. However, it is cumbersome to immerse a specimen to be examined and the objective lens system in a liquid. In particular, in an oil immersion objective lens system, the object is contaminated. It is difficult to apply the immersion objective lens system to an inverted microscope due to the limitation of the position of the object.

On the other hand, as is apparent from equation (i), use of an ultraviolet light source having a short wavelength is more advantageous than use of a visible light source to obtain a higher resolving power. For example, since the wavelength of the spectral line of a mercury lamp is 275 nm, a resolving power is doubled with respect to a visible light source (average wavelength: 550 nm).

Quartz and fluorite are known as optical materials for efficiently transmitting ultraviolet rays therethrough.

For example, in an ultraviolet microscope disclosed in Published Unexamined Japanese Patent Application No. 64-62609, a mercury lamp is used as a light source. All lens systems such as an objective lens system and an eyepiece system in an optical path of an ultraviolet ray from the mercury lamp are made of quartz.

Quartz and fluorite, however, cannot correct chromatic aberrations of light ranging from the ultraviolet range to the visible light range. For example, in a microscope disclosed in Published Unexamined Japanese Patent Application No. 61-189515, an excimer laser source as a substantially monochromatic light source is used to solve the problem of chromatic aberrations.

Illumination light used for observation is limited to a single wavelength regardless of types of light sources. This cannot cope with observations in a wide wavelength range. For example, observations ranging from the visible range to the ultraviolet range cannot be performed, and positioning of an object under visible light cannot be performed.

Since each of the microscopes disclosed in the above prior arts has only one observation optical path, simultaneous observation using a plurality of observation units cannot be performed.

An ultraviolet reflection microscope using a reflection objective lens is also known to those skilled in the art. This microscope can cope with a light source having a wide wavelength range because reflection does not depend on the wavelengths.

Since the reflection objective lens, however, is made of two reflecting surfaces each having a curvature, the curvature of field cannot be corrected, and a good image cannot be obtained in the peripheral area of the visual field.

SUMMARY OF THE INVENTION

It is an object of the present invention to provide a dry ultraviolet microscope system capable of observing an image of a specimen in a wide range from a visual range to an ultraviolet range upon correction of chromatic aberrations of the specimen.

It is another object of the present invention to provide a dry ultraviolet microscope system capable of superposing a visible color picture of a specimen on an ultraviolet picture thereof and displaying a superposed picture.

It is still another object of the present invention to provide a dry ultraviolet microscope system capable of performing simultaneous observation using a plurality of observing equipment.

According to an aspect of the present invention, there is provided an ultraviolet microscope comprising: a stage for holding a specimen to be examined; light source means for emitting light having a wavelength range from a visible range to a near-ultraviolet range; an optical lens system including an illumination lens system for illuminating the specimen held on the stage with light emitted from the light source means and an image forming lens system having an objective lens system for focusing an enlarged optical image of the specimen by light from the specimen, at least the illumination lens system and the objective lens system being made of an optical material which can transmit light having at least a wavelength range from the visible range to the near-ultraviolet range and which can correct a chromatic aberration of an image position and a chromatic aberration of a magnification with respect to the light having the wavelength range; first observing means for observing at least an ultraviolet image of the specimen; and second observing means for observing at least a visible image of the specimen.

According to this ultraviolet microscope, by using the optical material for transmitting the light having the wavelength from the visible range to the near-ultraviolet range, the ultraviolet image having a large magnification and a high resolving power can be observed, and at the same time the visible image can be observed. For example, the object is positioned in the visible range, and an observation which requires a large magnification and a high resolving power can be performed in the near-ultraviolet range. In this case, the chromatic aberration of the lens system made of the above optical material is corrected with respect to the light having the wavelength range from the visible range to the near-ultraviolet range. Therefore, a high-quality color-corrected image in the range from the visible range to the near-ultraviolet range can be obtained.

According to another aspect of the present invention, there is provided an ultraviolet microscope comprising: a stage for holding a specimen to be examined; light source means for emitting light having a wavelength range from a visible range to a near-ultraviolet range; an optical lens system including an illumination lens system for illuminating the specimen held on the stage with light emitted from the light source means and an image forming lens system having an objective lens system for focusing an enlarged optical image of the specimen by light from the specimen, at least the illumination lens system and the objective lens system being made of an optical material which can transmit light having at least a wavelength range from the visible range to the near-ultraviolet range and which can correct a chromatic aberration of an image position and a chromatic aberration of a magnification with respect to the light having the wavelength range; means for splitting an optical image of the specimen to be focused by the objective lens system into a visible image and an ultraviolet image; ultraviolet image pickup means for picking up the ultraviolet image and converting the ultraviolet image into a monochrome picture signal; visible color image pickup means for picking up the visible image and converting the visible image into a color picture signal; signal output superposing means for receiving the monochrome picture signal output from the ultraviolet image pickup means and the color picture signal output from the visible color image pickup means and superposing the monochrome picture signal and the color picture signal to output a superposed picture signal; and display means for displaying a pseudo color picture of the specimen on the basis of the superposed picture signal.

According to this ultraviolet microscope, the optical image of the specimen is split into the ultraviolet image and the visible image. The ultraviolet image is picked up as the monochrome picture, and the visible image is picked up as the visible color picture. The monochrome picture and the visible color picture are superposed on each other so that the near-ultraviolet picture having a large magnification and a high resolving power can be displayed as the pseudo color picture. The microstructure of the specimen can be observed, and at the same time, the color of the specimen can be visually checked.

According to still another aspect of the present invention, there is provided an ultraviolet microscope comprising: a stage for holding a specimen to be examined; ultraviolet light source means; an optical lens system including an illumination lens system for illuminating the specimen held on the stage with an ultraviolet ray emitted from the ultraviolet light source means and an image forming lens system having an objective lens system for focusing an enlarged ultraviolet image of the specimen by the ultraviolet ray from the specimen, the illumination lens system and the image forming lens system being made of an optical material which can transmit the ultraviolet ray and which can correct a chromatic aberration of an image position and a chromatic aberration of a magnification with respect to the ultraviolet ray; means for dividing, into a plurality of paths, an optical path of the ultraviolet image to be focused by the image forming lens system; and observing means for observing ultraviolet images in the plurality of paths.

According to this ultraviolet microscope, the numerical aperture of the objective lens system can be increased by employing the optical material which can transmit the ultraviolet ray therethrough, thereby obtaining an ultraviolet image having a large magnification and a high resolving power. Upon correction of chromatic aberrations of the magnification of the ultraviolet ray and the image position, a good image free from chromatic aberrations can be obtained. In addition, since the optical path of the ultraviolet image is divided into the plurality of paths, for example, a plurality of ultraviolet images can be observed by different types of observing equipments. According to an embodiment of the present invention, since the optical path of the ultraviolet ray is divided into a plurality of paths in accordance with a wavelength range, observation is not limited to that of an ultraviolet ray having a single wavelength.

All the ultraviolet microscopes described above are dry systems, and observations are performed in air. Therefore, all the ultraviolet microscopes are easy to handle, and good processing efficiency of the microscopic examinations can be achieved.

In this specification, a "lens system" or "... lens system" means a system including one optical lens or a plurality of optical lenses. An "eyepiece system" means a system including an eye lens, a field lens, and the like to perform observation with a naked eye or eyes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view showing an ultraviolet microscope for simultaneously displaying an ultraviolet picture and a color picture according to the first embodiment of the present invention;

FIG. 2 is a longitudinal sectional view showing a centering mechanism of a revolver shown in FIG. 1;

FIG. 3 is a plan view showing the centering mechanism of FIG. 2;

FIG. 4 is a schematic view showing an ultraviolet microscope for simultaneously displaying an ultraviolet picture and allowing visual observation of the ultraviolet picture according to the second embodiment of the present invention;

FIG. 5 is a schematic view showing an ultraviolet microscope as a photographic system according to the third embodiment of the present invention;

FIG. 6 is a view showing part of an optical layout for causing a filter to split a wavelength range into a visible range and an ultraviolet range according to the fourth embodiment of the present invention;

FIG. 7 is a schematic view showing an ultraviolet microscope as a microspectroscopic system according to the fifth embodiment of the present invention;

FIG. 8 is a schematic view of an optical system of an ultraviolet microscope having a downward incidence illumination system and a transmission illumination system to perform observation from a visible range to a near-ultraviolet range;

FIG. 10 is a block diagram of a circuit used in an image processing system in FIG. 9 to superpose the ultraviolet picture on the color picture; 10

FIG. 14 is a plan view showing a reference specimen to be used for adjusting a television camera by the powered fine adjustment mechanism shown in FIG. 13;

FIG. 15 is a longitudinal sectional view showing a manual fine adjustment mechanism for one television camera according to the eighth embodiment of the present invention;

FIG. 16 is a schematic view showing an ultraviolet microscope for independently observing a near-ultraviolet range and a wavelength range of less than 330 nm; and FIG. 17 is a schematic view showing an optical system of an ultraviolet microscope for performing ultraviolet photography and ultraviolet picture display according to the tenth embodiment of the present invention.

DETAILED DESCRIPTION OF THE PREFERRED EMBODIMENTS

Figure 9:
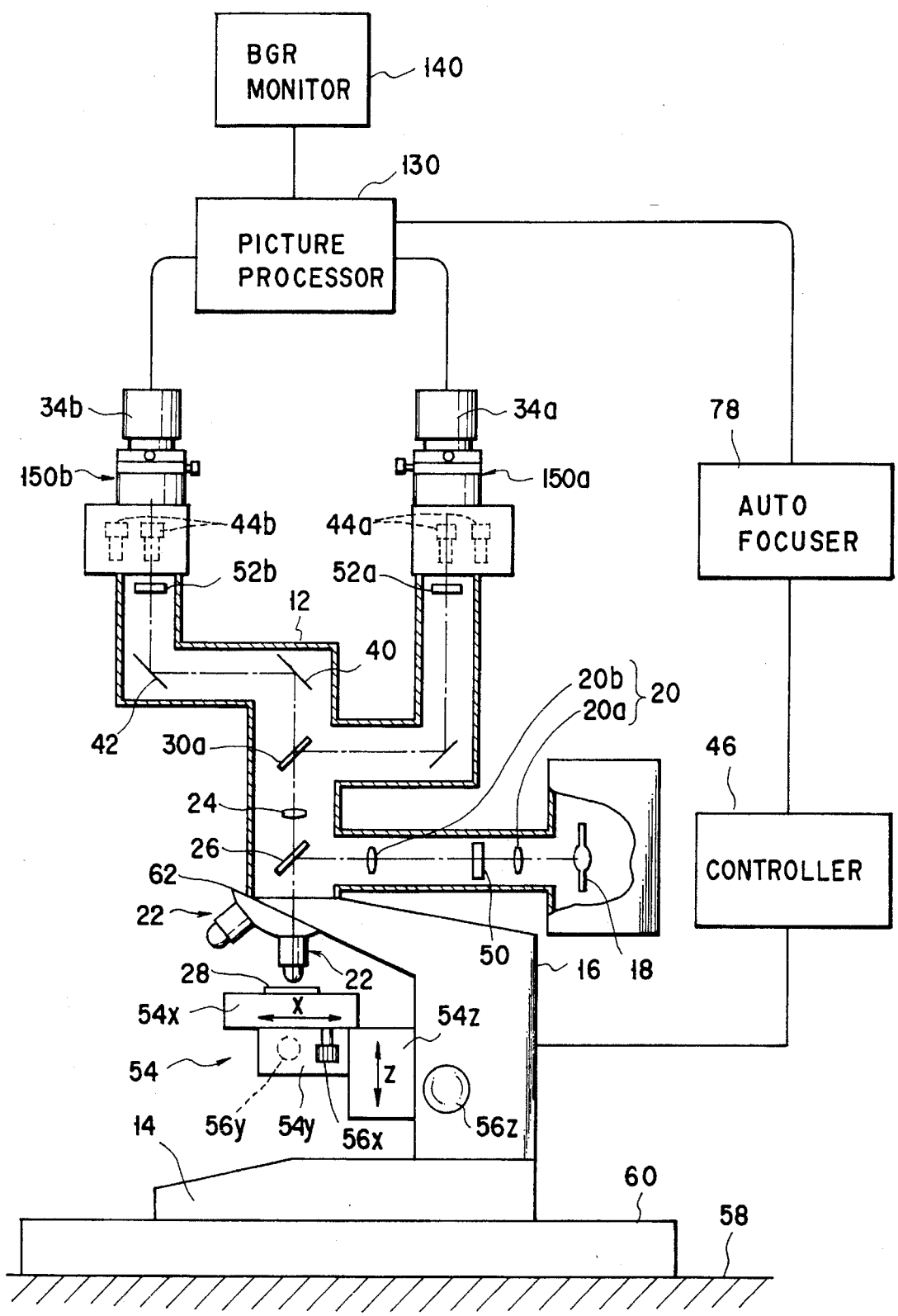
FIG. 9 is a schematic view showing an ultraviolet microscope for superposing an ultraviolet picture on a color picture and displaying a superposed picture according to the seventh embodiment of the present invention.

An ultraviolet microscope shown in FIG. 1 comprises a body tube 12 supported on a base 14 through an arm 16. The body tube 12 comprises a light source 18 and an optical lens system including an illumination lens system 20, an objective lens system 22, and a focusing lens system 24 arranged along its optical path.

Of all the optical lens systems, at least all lenses constituting the illumination lens system 20 and the objective lens system 22 are made of an optical material which can properly transmit light in a wavelength range (330 nm to 600 nm) from a visible range to a near-ultraviolet range. In addition, the chromatic aberration of an image position of each lens and the chromatic aberration of a magnification of each lens have been corrected. This optical material having a thickness of 10 mm preferably has a transmittance of 70% or more with respect to light having a wavelength of 350 nm. In addition, the optical material is preferably free from self-fluorescence with respect to light having a wavelength range from the visible range to the near-ultraviolet range.

The above optical material can be exemplified by i-ray glass used in an illumination lens system of an ultraviolet excited fluorescence microscope. For example, crown glass materials such as BSL7Y, LAL61, and ZSL7 (all are tradenames) and flint glass materials such as PBM8Y (tradename) available from OHARA INC., Sagamihara-City, Kanagawa Prefecture, Japan can be used for this purpose. These materials can correct the chromatic aberration of the image position and the chromatic aberration of the magnification in the range from the visible range to 330 nm.

In the following description, the "visible-near-ultraviolet range" indicates the wavelength range from the visible range to the near-ultraviolet range. The "i-ray glass" indicates not only the above products but also a non-quartz or non-fluorite optical material which can properly transmit light in the visible-near-ultraviolet range. In addition, the "chromatic aberration" means the chromatic aberration of the image position and the chromatic aberration of the magnification with respect to light in the visible-near-ultraviolet range, unless otherwise specified.

Use of the i-ray glass and correction of the chromatic aberration allow use of the light source 18 for emitting light in the visible-near-ultraviolet range. The light source 18 comprises, for example, a mercury lamp, a xenon lamp, a mercury-xenon lamp, or an equivalent thereof.

The optical layout of the ultraviolet microscope along the optical path from the light source 18 will be briefly described below.

The illumination lens system 20 for appropriately focusing light from the light source 18 comprises, e.g., a collector lens 20a and a condenser lens 20b. Light from the light source 18 and condensed by these lenses 20a and 20b is reflected by a half mirror 26 and is focused by the objective lens system 22. The focused light is incident on a specimen to be examined, e.g., a semiconductor device 28. The objective lens system 22 can comprise a lens having a high resolving power because an ultraviolet ray is used. In addition, the objective lens system 22 is preferably a system comprising a plurality of lenses and providing a good image of the peripheral area of the visual field.

Light reflected by the specimen 28 is enlarged by the objective lens system 22 and passes through the half mirror 26 and the focusing lens system 24. The focusing optical path of the focusing lens system 24 is split into an ultraviolet optical path and a visible light optical path by a dichroic mirror 30a.

In this case, the ultraviolet ray is reflected by the dichroic mirror 30a and then a reflecting mirror or a total reflection prism 32. The reflected light is focused on an image pickup surface (not shown) of an ultraviolet television camera 34a.

The ultraviolet television camera 34a includes an image pickup device having a high resolving power and corresponding to a near-ultraviolet range, i.e., a solid-state image pickup device such as a CCD, CID, CMD, or SIT or an image pickup tube such as a vidicon. This television camera 34a converts an input image (ultraviolet image) focused on the image pickup surface thereof into an electrical picture signal and preferably supplies the electrical picture signal to an ultraviolet display 38a through an ultraviolet picture processor 36a. The display 38a is a monochrome display. The display 38a displays a real-time monochrome picture corresponding to the ultraviolet image of the specimen 28 on the basis of an input signal from the television camera 34a. Since the numerical aperture of the objective lens system 22 can be increased by use of the i-ray glass, a monochrome picture of a high resolving power can be displayed on the display 38a. For example, when a mercury lamp having a 365-nm bright line spectrum is used as the light source 18, and the numerical aperture of the objective lens system 22 is set to be 0.85, a resolving power of about 0.26 μm can be obtained.

On the other hand, visible light is transmitted through the dichroic mirror 30a and is reflected by reflecting mirrors or total reflection prisms 40 and 42. The reflected light is focused on the image pickup surface (not shown) of a color television camera 34b. The television camera 34b includes a color image pickup device. This television camera 34b converts an input image (visible image) formed on the image pickup surface into an electrical color picture signal. This picture signal is preferably supplied to a color display 38b through a picture processor 36b. The display 38b displays a real-time color picture corresponding to the visible image of the specimen 28 in accordance with an input signal from the color television camera 36b.

By the above operations, an ultraviolet picture of the minute area of the specimen 28 at a high resolving power can be observed on the display 38a. At the same time, the color of the minute area of the specimen 28 can be observed on the display 38b. This arrangement can cope with, e.g., a defect test of a 16-Kbyte dynamic type RAM.

In addition, since an image whose chromatic aberrations are properly corrected can be obtained in a range from an argon laser (wavelength: 351 nm) and an i-ray (wavelength: 365 nm) to visible light (wavelength: about 600 nm), the ultraviolet microscope is advantageous not only in tests of semiconductor devices but also in spectrum analysis and fluorescence spectrum analysis in the visible-near-ultraviolet range.

The optical arrangement of the ultraviolet microscope and a picture formation arrangement will be described in detail below.

The dichroic mirror 30a in FIG. 1 can be replaced with a dichroic prism having similar wavelength selection characteristics. In addition, a reflecting mirror may be appropriately added to the microscope, or the transmittance and reflectance of the dichroic mirror 30a may be changed.

In an optical layout wherein an optical image of the specimen 28 from the focusing lens system 24 is split into an ultraviolet image and a visible image by an optical element 30a having the above wavelength selection characteristics, the position and magnification of the ultraviolet image on the image pickup surface can be different from those of the visible image on the image pickup surface. Therefore, the chromatic aberrations of the focusing lens system 24 for the light in the visible-near-ultraviolet range need not be corrected.

The television cameras 34a and 34b comprise image enlargement or pickup lens systems 44a and 44b for variably magnifying the input images, respectively. These enlargement lens systems 44a and 44b can correct chromatic aberrations in the near-ultraviolet and visible ranges, respectively. When these enlargement lens systems 44a and 44b can be arranged to variably change magnifications independently of each other, the ultraviolet picture and the color picture of the specimen 28 can be simultaneously observed at different magnifications.

For example, while an ultraviolet picture having a large magnification is observed, the color television camera 34b is set to have a low magnification and focusing and positioning of the object can be performed with the visible picture being observed on the display 38b. In this case, the chromatic aberration of the image position even in the visible range is corrected, so that the visible picture can be easily visually checked.

Alternatively, when image pickup positions of the television cameras 34a and 34b are set in a parfocal position, the ultraviolet image in the ultraviolet television camera 34a and the visible image in the color television camera 34b are observed at the parfocal position.

The picture displayed on the ultraviolet television camera 34a is particularly subjected to preferably the following image quality improvement.

Referring to FIG. 1, a picture signal output from the television camera 34a to the display 38a is processed by the picture processor 36a. The picture processor 36a controlled by a controller 46 has known picture processing functions in the picture processing techniques. For example, these functions are an interpicture arithmetic function of eliminating fixed pattern noise of the television camera 34a, a multiplication function of eliminating random noise or improving the lightness of a picture, a gamma correction function of partially emphasizing a picture luminance distribution, an image blur preventive function of displaying a picture prior to vibration detection as a still picture upon detection of the vibration of the picture on the basis of an output signal from a television camera, a feature extraction function, a filtering function, and the like.

Ultraviolet images are often observed at large magnifications of several hundreds to several thousands of times. Since a light amount is in inverse proportion to the square of the magnification of an optical system, the resultant picture becomes very dark unless an image improvement is performed. The dark picture can be improved by increasing the brightness of the picture by the multiplication function and the gamma correction function of the picture processor 36a and by emphasizing the dark portion of the picture.

When the television camera 34a is used by increasing its sensitivity, noise of the picture signal is increased. In order to reduce this noise, the interpicture arithmetic function and the multiplication function of the picture processor 36a are effective.

The color television camera 34b may have the processor 36b similar to the picture processor 36a.

Output pictures from the picture processors 36a and 36b may be output to video printers 48a and 48b to form hard copies to preserve pictures. In this case, the video printer 48a for the ultraviolet picture is preferably compatible with a picture having a high resolving power, and the video printer 48b for the visible picture is preferably compatible with a color representation.

The mechanical structure of the ultraviolet microscope shown in FIG. 1 will be mainly described below.

Most of the light sources corresponding to the visible-near-ultraviolet range cannot be frequently turned on/off. For this reason, a mechanical shutter 50 capable of shielding light from the light source 18 is preferably arranged in the body tube 12 without turning off the light source 18. When an object susceptible to an ultraviolet ray is to be observed, ultraviolet radiation is prevented during non-observation by the shutter 50 to minimize damage to the object. The light source shutter 50 may be manually opened/closed but is preferably controlled by the controller 46. In this case, it is advantageous to arrange a sensor (not shown) for monitoring a use state of an interchangeable or detachable assembly (e.g., an objective lens system) in the ultraviolet microscope. When the sensor detects a state in which each assembly is detached or interchanged, the controller 46 closes the shutter 50 to automatically shield light from the light source 18, thereby preventing scattering of the ultraviolet rays to the peripheral area. When the ultraviolet television camera 34a comprises the picture processor 36a, the enlargement lens system 44a may have a shutter 52a for nullifying an incident light amount of the image pickup surface of the television camera 34a. When the shutter 52a is closed, and the television camera 34a picks up an image in a non-incident state, a picture as a background image can be obtained. When the picture processor 36a subtracts the background picture from the actual picture in the open state of the shutter 52a, noise of a fixed pattern unique to the television camera 34a can be eliminated. Therefore, a good picture having a high signal-to-noise ratio can be obtained. The enlargement lens system 44b of the color television camera 34b may have a shutter 52b similar to the shutter 52a. Opening/closing of the shutters 52a and 52b may be controlled by the controller 46 or manually.

A mechanical stage 54 for holding the specimen 28 is supported on the arm 16 of the ultraviolet microscope.

The mechanical stage 54 in the embodiment of FIG. 1 comprises a Z stage 54z supported on the arm 16, and Y and X stages 54y and 54x subsequently mounted on the Z stage 54z. The Z stage 54z can be finely moved along the optical axis (Z-axis) of the objective lens system 22 to change the relative position between the specimen 28 and the objective lens system 22 to perform a focusing operation. The X stage 54x can be finely moved in a horizontal direction along the x-axis perpendicular to the Z-axis to easily move the minute target observation area of the object within the visual field. Similarly, the Y stage 54y can be finely moved in a horizontal direction perpendicular to the X- and Y-axes. These X, Y, and Z stages 54x, 54y, and 54z may be controlled and driven manually using adjustment screws 56x, 56y, and 56z or may be controlled by the controller 46.

The base 14 of the ultraviolet microscope is preferably placed on an anti-vibration table 60 to mechanically prevent vibrations transmitted from a floor 58. This anti-vibration table 60 uses a passive system using an air spring, an active anti-vibration mechanism for detecting vibrations and canceling these vibrations, or the like. Use of this anti-vibration table 60 is advantageous in a large-magnification observation in which a small vibration causes image blurring.

A revolver or revolving nose piece schematically denoted by reference numeral 62 supports the plurality of objective lens systems 22 and can selectively change the objective lens systems upon its rotation. Rotating turrets denoted by reference numerals 64a and 64b support a plurality of enlargement lens systems 44a and 44b and can selectively change the enlargement lens systems upon their rotations. By switching between the objective lens systems 22 and/or the enlargement lens systems 44a and 44b, the ultraviolet microscope can have a variable magnification. The revolver 62 and the turrets 64a and 64b may cause deviations of the optical axis of each lens system caused by relative eccentricity of the optical axes and may cause an image to fall outside the range of the visual field. Allowances of the deviations of the optical axes cannot be obtained by normal machining. Therefore, the revolver 62 and the turrets 64a and 64b preferably have centering mechanisms.

FIGS. 2 and 3 show an arrangement of a centering mechanism incorporated in the revolver 62 in this embodiment. Recessed surfaces 66 (only one recessed surface is illustrated) are formed at a plurality of predetermined positions inside the revolver 62. A mounting hole 68 is formed in each recessed surface 66, and an annular holding member 70 is loosely fitted in the mounting hole 68. An internal thread 70a is formed on the inner surface of the holding member 70. An external thread 72a formed on the outer surface of a sleeve 72 of each objective lens system 22 is meshed with the internal thread 70a. A gap 74 is formed between the outer surface of the holding member 70 and the inner surface defined by the mounting hole 68. The outer diameter of an upper end portion 70b of the holding member 70 is larger than the inner diameter defined by the mounting hole 68. Therefore, the holding member 70 is movable within the plane perpendicular to an optical axis 22a of the objective lens system 22 while the bottom surface of the upper end portion 70b is kept in contact with the recessed surface 66. A tapered surface 70c is formed on the outer surface of the upper end portion 70b of the holding member 70. Two positioning members 76a and one ball 76b are arranged at almost equal intervals around the tapered surface 70c. The two positioning members 76a are fixed in contact with the tapered surface 70c. The ball 76b is supported by a spring 76c to elastically urge the holding member 70 against the positioning members 76b. The optical axis 22a of the objective lens system 22 is centered by the positioning members 76a and the ball 76b. This centering mechanism can be arranged in each of the turrets 64a and 64b.

The revolver 62 and the turrets 64a and 64b can be rotated by an electromotor (not shown) controlled by the controller 46 to control the total magnification of the ultraviolet microscope by the controller 46, as is known well to those skilled in the art. A revolver or turret with an electromotor disclosed in U.S. Pat. No. 4,961,636, issued to Gaul et al. on Oct. 9, 1990, can be used. When observation is to be performed by changing a total magnification, the total magnification is increased or decreased by the controller 46, so that an abrupt change in magnification does not occur and the observation can be facilitated.

If a plurality of combinations of magnifications of the objective lens systems 22 and the enlargement lens systems 44a or 44b are available for the same total magnification, it is preferable that the controller 46 preferentially selects a combination having a larger numerical aperture of the objective lens system 22. Table I shows combinations obtained when the magnifications of the objective lens systems 22 are ×10, ×50, and ×100, and the magnifications of the enlargement lens systems 44a or 44b are ×1, ×2, and ×4.

TABLE I

| Magnification of Objective Lens System | Magnification of Enlargement Lens System | Total Magnification |
|---|---|---|
| 10 | 1 | 10 |
| 10 | 2 | 20 |
| 10 | 4 | 40 |
| 50 | 1 | 50 |
| 100 | 1 | 100 |
| 100 | 2 | 200 |
| 100 | 4 | 400 |

Assume that the numerical aperture of the ×100 objective lens system is larger than that of the ×50 objective lens system. As combinations for the total magnification of 100, a combination of the ×50 objective lens system and the ×2 enlargement lens system is possible. However, a combination of the ×100 objective lens system and the ×1 enlargement lens system is selected as a combination having a higher numerical aperture of the objective lens system, thereby achieving observation with a higher resolving power.

One of the enlargement lens systems supported by the turrets 64a and 64b can be replaced with a shutter (not shown) in an alternative arrangement. In this case, the optical path can be blocked by switching the turret, and the shutters 52a and 52b can be omitted.

In addition, each of the turrets 64a and 64b which support the plurality of enlargement lens systems 44a and 44b may be replaced with one zoom lens system.

Focusing of the ultraviolet microscope in FIG. 1 will be described below.

The focal depth of the objective lens system 22 becomes small in proportion to the wavelength. It is difficult to perform focusing during ultraviolet image observation. In order to eliminate this drawback, an auto focuser 78 is arranged in the ultraviolet television camera 34a in the embodiment shown in FIG. 1. The auto focuser 78 controlled by the controller detects a defocus amount of the television camera 34a. The controller 46 drives the Z stage 54z to perform focusing on the basis of the detected defocus amount. Therefore, appropriate focusing can be performed, and an in-focus image can be obtained.

Since the light amount is inevitably reduced during observation at a large magnification, it is appropriate to use a signal output from the television camera 34a as a signal input to the auto focuser 78. More specifically, a high-frequency component of a picture signal from the television camera 34a is extracted, and a defocus amount can be detected by the passive system which evaluates the defocus amount.

Alternatively, when a sufficiently large light amount can be obtained because observation is performed at a low magnification or an object has a large reflectance, an auto focus sensor (not shown) may be arranged independently of the television camera 34a, and an output signal from the auto focus sensor may be supplied to the auto focuser 78. In this case, high-speed auto focusing can be achieved.

FIG. 4 shows the second preferred embodiment of the present invention. The same reference numerals as in the first embodiment denote the same parts in the second embodiment. An ultraviolet microscope of the second embodiment in FIG. 4 is different from that of the first embodiment in that a near-ultraviolet picture can be obtained and at the same time a visible image can be visually observed with a naked eye through an eyepiece system.

Referring to FIG. 4, an optical system from a light source 18 to a focusing lens system 24 is identical to that of the first embodiment.

The focusing optical path of the focusing lens system 24 is split into an ultraviolet optical path and a visible light optical path by a dichroic mirror 30b. The wavelength selection characteristics of the dichroic mirror 30b are totally opposite to those of the dichroic mirror 30a of the first embodiment. That is, the dichroic mirror 30b transmits an ultraviolet ray and reflects visible light.

In an optical path of light having passed through the dichroic mirror 30b, an ultraviolet image from the focusing lens system 24 is variably magnified by an enlarged lens system 44a and is projected on an image pickup surface (not shown) of an ultraviolet television camera 34a. The ultraviolet image picked up by the television camera 34a is displayed on a display 38a.

In an optical path of light having reflected by the dichroic mirror 30b, a visible image from the focusing lens system 24 is guided to an eyepiece system 80. An intermediate image position (not shown) of the eyepiece system 80 is parfocal with the image pickup position of the television camera 34a. The ultraviolet image from the television camera 34a and the visible image from the eyepiece system 80 can be simultaneously focused.

An ultraviolet cover 82 extends from a lens barrel 12 located at a position below the eyepiece system 80. The ultraviolet cover 82 prevents an ultraviolet ray reflected by an specimen 28 to be examined during observation from leaking outside the ultraviolet microscope. The ultraviolet cover can protect eyes of an observer from the ultraviolet ray. The material of the ultraviolet cover 82 is preferably a material which can transmit visible light therethrough so as to allow the observer to observe the specimen 28 with a naked eye through the ultraviolet cover.

According to the ultraviolet microscope described above, the visible light can be guided to the eyepiece system 80 and the ultraviolet ray can be guided to the television camera 34a by the wavelength selectivity of the dichroic mirror 30b. Incidence of the ultraviolet ray to the eyepiece system 80 and hence the eyes of the observer can be prevented.

The minute area of the specimen 28 can be visually observed with a naked eye through the eyepiece system 80, and at the same time, the ultraviolet picture of the minute area of the specimen 28 can also be observed on the display 38a.

In addition, focusing and positioning can be performed while the visible image is observed through the eyepiece system 80.

A monocular eyepiece system is illustrated as the eyepiece system 80. However, a binocular eyepiece system may be used in place of the monocular eyepiece.

FIG. 5 shows the third preferred embodiment of the present invention. The same reference numerals as in the first and second embodiments denote the same parts in the third embodiment. An ultraviolet microscope of the third embodiment is different from that of the second embodiment of FIG. 5 in that a photographic unit 84 is arranged in place of the television camera 34a. This photographic unit 84 preferably uses a silver salt film sensitive to at least a near-ultraviolet range. Since a silver salt photograph is excellent in resolution, it is suitable for photographing an ultraviolet image having a high resolving power. The photographic unit 84 may be a 35-mm film pack or a large-film pack available from Polaroid Inc. A film to be used in the photographic unit 84 may be, for example, a panchromatic film, an orthochromatic film, or a monochrome film having a sensitivity in the near-ultraviolet range. Since the panchromatic film can also be used for even visible light, it is easily accessible.

An intermediate image position 80a of an eyepiece system 80 is parfocal with a film surface 84a of the photographic unit 84. The ultraviolet image on the film surface 84a and the visible image through the eyepiece 80 can be simultaneously focused.

When a photograph is to be taken, focusing and positioning of a specimen 28 must be performed.

The magnification of the eyepiece system 80 is selected so that the visual field of the eyepiece system 80 includes the visual field on the film surface 84a. A focal plate 86 is located at the intermediate image position 80a of the eyepiece system 80, and the visual field frame on the photograph is projected on the focal plate 86. In this state, X and Y stages 54x and 54y are driven to position a specific area of the specimen 28 within the visual field frame.

Focusing is performed through the eyepiece system 80. The focal depth at the image position is decreased in proportion to the wavelength. The depth of the ultraviolet ray on the film surface 84a by the photographic unit 84 is small, and the depth of visible light at the intermediate image position 80a of the eyepiece system 80 is large. For this reason, even when the eyepiece system 80 is set in an in-focus state, the photographic unit 84 may not be set in the in-focus state.

When it is assumed that the focal depth is in inverse proportion to the square of the total magnification, the following fact can be found. When the eyepiece system 80 is replaced with an eyepiece system 80' having an appropriate magnification so that the focal depth of the eyepiece system is set to be equal to or smaller than the focal depth of the photographic unit 84, and when focusing is performed using the eyepiece system 80', the photographic unit 84 can be set in the in-focus state.

FIG. 6 shows the fourth preferred embodiment of the present invention. This embodiment is a modification of the optical systems of the second embodiment (FIG. 4) and the third embodiment (FIG. 5). That is, a visible range and a near-ultraviolet range are split by a spectral filter.

Referring to FIG. 6, an element having no wavelength selectivity, such as a half mirror or beam splitter is used in place of the dichroic mirror 30b as an optical element 30c for splitting an optical path of light reflected by an object into two paths. A first spectral filter 88 is located between an illumination lens system 20 and a half mirror 26, and a second spectral filter 90 is located between the half mirror 26 and a focusing lens system 24. These spectral filters 88 and 90 are interchangeable, and filters having filter characteristics for transmitting only light components having optimal wavelength ranges are selected in accordance with an observation purpose. The optical path of light reflected by a specimen 28 and having passed through a focusing lens system 24 is split into an optical path on the side of an eyepiece system 80 and an optical path on the side of an enlargement lens system 44a by the optical path splitting optical element 30c.

Since the optical element 30c does not have wavelength selectivity, the visible image and the near-ultraviolet image can be selectively observed on the optical path on the side of the enlargement lens system 44a upon selection of the spectral filters 88 and 90.

When a television camera compatible with the visible-near-ultraviolet range is used as the television camera 34a of the second embodiment, and visible light transmission filters are used as the spectral filters 88 and 90, a visible picture can be observed on a display 38a. However, when ultraviolet transmission filters are selected as the spectral filters 88 and 90, an ultraviolet picture can be observed on the display 38a.

Similarly, when a film sensitive to the visible-near-ultraviolet range is used in the photographic unit 84 of the third embodiment, the visible image and the ultraviolet image can be selectively photographed by selection of the spectral filters 88 and 90.

In either case, visible light in addition to the near-ultraviolet ray must be transmitted through the focusing lens system 24 and the enlargement lens system 44a. The focusing lens system 24 and the enlargement lens system 44a must be made of i-ray glass, and the chromatic aberrations thereof must be corrected with respect to the visible-near-ultraviolet range.

When an image is to be observed with a naked eye, the ultraviolet ray must be prevented from entering into the eye of the observer through the eyepiece system 80. For example, an ultraviolet cut filter 92 must also be arranged in the optical path on the side of the eyepiece system 80, as shown in FIG. 6, or an ultraviolet cut filter is used as the first spectral filter 88 during observation with a naked eye. Alternatively, an eyepiece system which can shield an ultraviolet ray is used as the eyepiece system 80.

The optical element 30c can be replaced with a switching mirror. This switching mirror selectively switches the optical path of light reflected by the object into the optical path on the side of the enlargement lens system 44a or the optical path on the side of the eyepiece system 80. In this case, a switching mirror may incorporate a shutter for nullifying the transmitted light to the television camera 34a or the photographic unit 84 in place of use of a shutter 52a. The switching mirror can be operated manually or by a controller 46.

FIG. 7 shows the fifth preferred embodiment of the present invention. The same reference numerals as in the first to fourth embodiments denote the same parts in the fifth embodiment. In an ultraviolet microscope shown in FIG. 7, a microspectroscopic unit 94 for microspectroscopically measuring a minute area of an specimen 28 to be examined is used in place of the eyepiece system 80 of the second embodiment.

Light emitted from a light source 18 and condensed by an illumination lens system 20 is reflected by a half mirror 26 and is focused by an objective lens system 22. The focused light is incident on a target measurement area of the specimen 28. Light reflected by the specimen 28 is variably magnified by the objective lens system 22, passes through the half mirror 26 and a focusing lens system 24, and is incident on an optical path switching mirror 30d. The optical path switching mirror 30d selectively switches the focusing optical path of the focusing lens system 24 into an optical path of a reflecting mirror 96 or a television camera 34a. Light guided to the reflecting mirror 96 is reflected thereby and incident on the microspectroscopic unit 94. The television camera 96 need not be compatible with the near-ultraviolet range but can be compatible with the visible range.

A picture processor 36a has a function of superposing an index of a target measurement area on a picture signal from the television camera 34a to cause a display 38a to display a superposed picture, in addition to the functions of the picture processor 38a of the first embodiment.

The operation of the ultraviolet microscope shown in FIG. 7 will be described below.

Prior to execution of microspectroscopy of the specimen 28, a focusing optical path of the focusing lens system 24 is guided to the television camera 34a by the optical path switching mirror 30d. In this state, the specimen 28 is moved by X and Y stages 54x and 54y to align the target measurement area of the specimen 28 with the index on the display 38a.

The focusing optical path of the optical path switching mirror 30d is switched to the microspectroscopic unit 94, thereby performing microspectroscopy.

During microspectroscopy, since an image of the target measurement area of the specimen 28 is not input to the television camera 34a, a picture processor 48a displays a picture prior to microspectroscopy as a still picture on the display 38a.

According to the embodiment shown in FIG. 7, microspectroscopy can be performed while the target measurement area of the specimen 28 is kept checked in the visible-near-ultraviolet range.

FIG. 8 schematically shows an ultraviolet microscope according to the sixth embodiment of the present invention. The same reference numerals as in the first and third embodiments denote the same parts in the sixth embodiment. An ultraviolet microscope shown in FIG. 8 includes a transmission illumination system in addition to the downward incidence illumination system, and three observing means.

The arrangement of a system 100 for illuminating a specimen 28 downward with light emitted from a light source 18 is the same as the illumination system of the first embodiment.

Light reflected by the specimen 28 passes through an objective lens system 22a, a half mirror 26, and a focusing lens system 24. The light is then incident on an ultraviolet half mirror 96a. Light passing through the ultraviolet half mirror 96a passes through an ultraviolet enlargement lens system 44a and is focused on an image pickup surface of an ultraviolet television camera 34a. An ultraviolet picture of the specimen 28 which is picked up by the television camera 34 is displayed on a display 36a.

On the other hand, light reflected by the ultraviolet half mirror 96a is split into visible light and an ultraviolet ray by a dichroic mirror 96b. The ultraviolet ray reflected by the dichroic mirror 96b passes through the ultraviolet enlargement lens system 44a and is guided to a photographic unit 84. The visible light passing through the dichroic mirror 96b is guided to an eyepiece system 80.

The image pickup operation of the ultraviolet image by the television camera 34, the photographic operation of the ultraviolet image by the photographic unit 84, and observation of the visible image through the eyepiece system 80 can be simultaneously performed.

In order to photograph the visible image by the photographic unit 84 in an alternative arrangement, the dichroic mirror 96b may be replaced with an ultraviolet half mirror, and the ultraviolet enlargement lens system 44a in the photographic unit 84 may be replaced with a visible range enlargement lens system 44b. As a result, visible light is guided to the photographic unit 84. When this switching is automated, the photographic unit 84 can selectively photograph the ultraviolet or visible image in accordance with the light-sensitive characteristics of a film to be loaded.

A transmission illumination system 110 comprises a collector lens 114, a shutter 116, a reflecting mirror 118, and a condenser lens 120, which are sequentially arranged along a light source 112 similar to the light source 18. The collector lens 114 and the condenser lens 120 constitute an illumination lens system. According to this system 110, light from the light source 112 is properly focused on the specimen 28 on a stage 122 by the collector lens 114 and the condenser lens 120. The stage 122 for holding the specimen 28 is made of a material for transmitting light from the light source 112, e.g., made of i-ray glass.

Light having passed through the specimen 28 is guided to the television camera 34a, the photographic unit 84, and the eyepiece system 80 in the same manner as light reflected by the specimen 28 in the downward incidence illumination system 100.

The shutter 116 of the transmission illumination system 110 is identical to a shutter 50 of the downward incidence illumination system 100. One of the shutters 50 and 116 is closed in accordance with whether the specimen 28 is a light-transmitting specimen. The two shutters 50 and 116 may be opened in accordance with a specific type of the specimen 28. In addition, the two shutters 50 and 116 may be kept closed during a period except for the observation period. Note that the shutter 116 may be located between the reflecting mirror 118 and the condenser lens 120, as indicated by a dotted line, in place of the position indicated by a solid line.

In the arrangement of FIG. 8, the downward incidence illumination system 100 may be removed, and an ultraviolet microscope having only the transmission illumination system 110 as the illumination system may be arranged.

FIG. 9 shows the seventh preferred embodiment of the present invention. The same reference numerals as in the first embodiment denote the same parts in the seventh embodiment. An ultraviolet microscope in FIG. 9 has important differences from the ultraviolet microscope of the first embodiment in that a picture processor 130 superposes a monochrome picture from an ultraviolet television camera 34a on a color picture from a visible color television camera 34b to form a pseudo color picture and the pseudo color picture is displayed on a single RGB monitor 140.

FIG. 10 is a block diagram of an internal circuit in the picture processor 130 shown in FIG. 9. The color television camera 34b supplies an analog input to a synchronizing signal separator 132b and an analog-to-digital converter 133b of a color signal processing system 131b. The analog-to-digital converter 133b has three analog-to-digital converters corresponding to R (red), G (green), and B (blue). The synchronizing signal separator 132b separates a synchronizing signal included in an output signal from the color television camera and supplies the separated synchronizing signal to a phase-locked loop (PLL) circuit 134b. The PLL circuit 134b phase-locks an output timing of the analog-to-digital converter 133b with the input timing of an FIFO (first in first out) register 135b. The FIFO register 135b has three FIFO registers corresponding to R (red), G (green), and B (blue). The FIFO register 135b supplies three digital outputs from the analog-to-digital converter 133b to a first frame memory 137b in accordance with timing signals output from a timing generator 136. The frame memory 137b stores R, G, and B digital picture signals.

Similarly, the ultraviolet television camera 34a supplies digital inputs to a second frame memory 137a through a monochrome signal processing system 131a having a synchronizing signal separator 132a, an analog-to-digital converter 133a, a PLL circuit 134a, and a FIFO register 135a. That is, the analog outputs from the ultraviolet television camera 34a are converted into the digital signals in accordance with synchronizing signals. The digital signals are supplied to the second frame memory 137a in accordance with the timing signals from the timing generator 136 and are stored in the second frame memory 137a.

The outputs from the two television cameras 34a and 34b are supplied to the frame memories 137a and 137b in response to the corresponding sync signals and the timing signals from the timing generator 136 in accordance with the independent FIFO systems. Therefore, the timings at which the two television cameras 34a and 34b supply outputs to the picture processor 130 can be asynchronous.

The first and second frame memories 137b and 137a output stored digital picture signals in accordance with the timing signals from the timing generator 136. The data volume of each of the four output signals (R, G, B, and monochrome) is, e.g., 8 bits. The digital picture signals (32 bits=8 bits×4) are supplied to an LUT (Look Up Table) circuit 138 for forming a pseudo color picture.

The LUT circuit 138 superposes the monochrome signal on the RGB signal, and supplies the superposed signal to a digital-to-analog converter 139. This superposition is performed such that the monochrome signal from the ultraviolet television camera 34a is converted into one of the R, G, and B signals, or the gray scale level of the RGB signal from the color television camera 34b is changed in accordance with the density level of the monochrome signal. The digital-to-analog converter 139 supplies the RGB analog input superposed with the monochrome signal to an RGB monitor 140. The timing generator 136 synchronizes the output timings of the LUT circuit 138 with the input timings of the digital-to-analog converter 139 and synchronizes the output timings of the digital-to-analog converter 139 with the input timings of the RGB monitor 140. Therefore, the RGB monitor 140 displays a high-resolution monochrome picture from the ultraviolet television camera 34a as a pseudo color picture on the basis of the RGB picture from the color television camera 34b.

Figure 11:
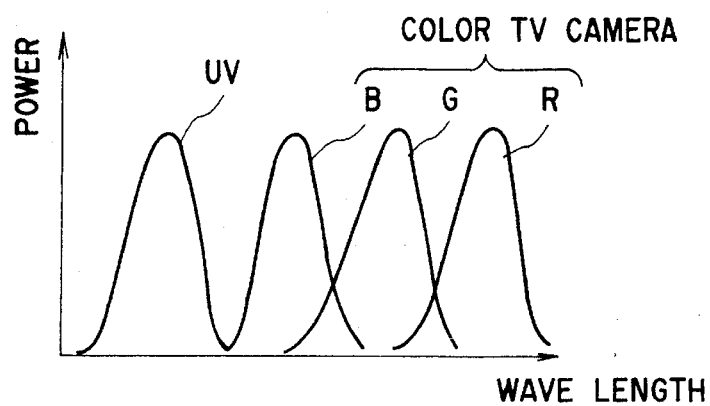
FIG. 11 is a graph showing wavelength-intensity characteristics between an ultraviolet television camera and a color television camera in FIG. 9.

Signal conversion by the LUT circuit 138 will be described in more detail. FIG. 11 shows wavelength characteristics of the ultraviolet television camera 34a and the color television camera 34b.

Figure 12A:
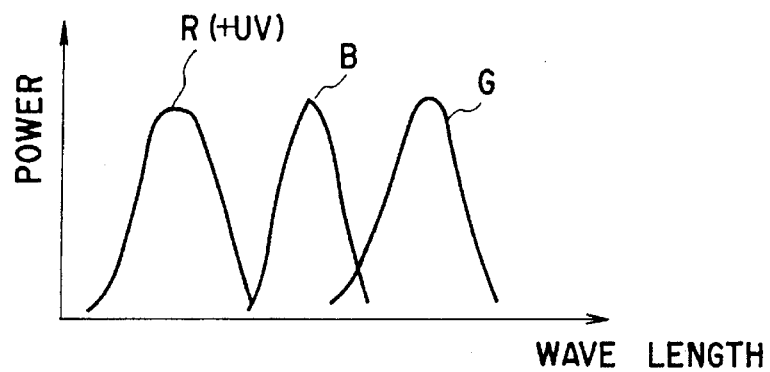
FIG. 12A is a graph showing wavelength-intensity characteristics obtained when an ultraviolet picture signal is superposed on a red picture signal.

Since the chromatic aberrations of the illumination lens system 20 and the objective lens system 22 of the ultraviolet microscope shown in FIG. 9 are corrected in the wavelength range of 330 nm to 600 nm, focusing performance of the red component is slightly lower than that of green, blue, and ultraviolet components. Assume that the LUT circuit 138 directly outputs the B and G input signals and converts the monochrome input signal into the R output signal. In this case, an RGB picture which satisfies focusing performance in all the red, green, and blue components can be obtained. In this case, the wavelength characteristics of the R, G, and B output signals are shown in FIG. 12A.

Figure 12B:
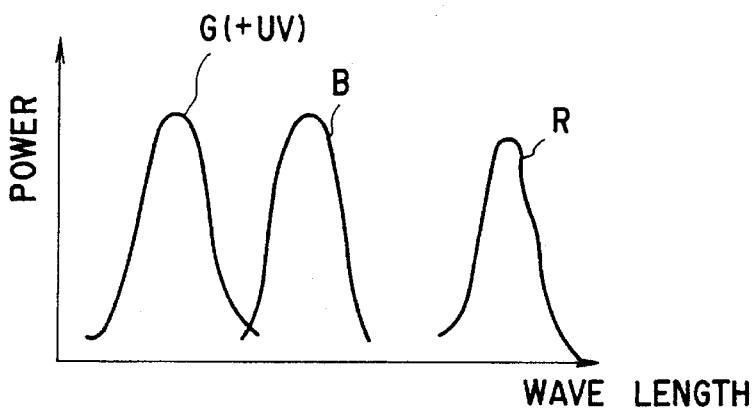
FIG. 12B is a graph obtained when an ultraviolet picture signal is superposed on a green picture signal in correspondence with FIG. 12A.

A human eye is most sensitive to green and uses green as the reference for resolution. For this reason, alternatively, the LUT circuit 138 may convert the monochrome input signal into the G output signal and may output this G output signal. In this case, the wavelength characteristics of the R, G, and B output signals are shown in FIG. 12B.

Figure 12C:
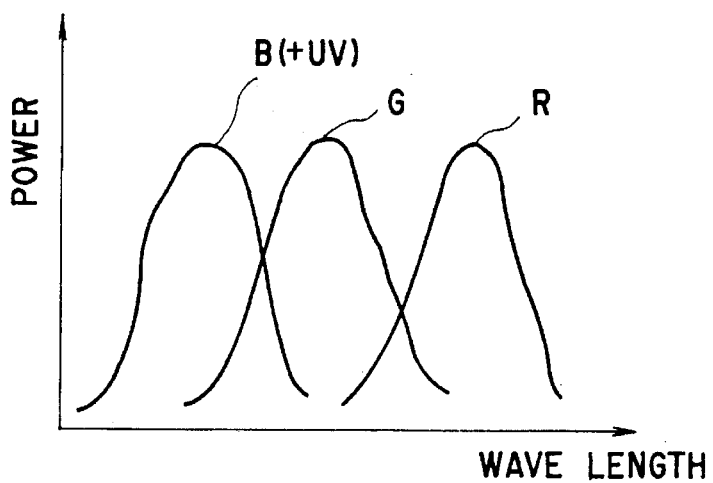
FIG. 12C is a graph obtained when an ultraviolet picture signal is superposed on a blue picture signal in correspondence with FIG. 12A.

Alternatively, the LUT circuit 138 may output the monochrome and B input signals in correspondence with the B output signal, the B and G input signals in correspondence with the G output signal, and the G and R input signals in correspondence with the R output signal. In this case, the wavelength ranges of red, green, and blue can be set larger than the actual wavelength ranges. The resultant wavelength characteristics of the R, G, and B output signals are shown in FIG. 12C.

Alternatively, the picture processor 130 may convert the brightness of the RGB signal into the brightness of the ultraviolet picture without changing the colors of the RGB picture, i.e., the hue and saturation. In this case, the LUT circuit 138 in the picture processor 130 has the first and second half steps. In the first half step, the R, G, and B input signals are converted into hues (H), saturations (C), and brightness values (V), and at the same time, the monochrome input signal is converted into its brightness. In the second half step, R, G, and B signals in which their brightness values are replaced with that of monochrome input signal are output.

The steps executed by the LUT circuit 138 can be rewritten in the program in the LUT circuit 138. The steps are not limited to the ones described above. Appropriate signal conversion suitable for a specimen 28 can be employed.

When an ultraviolet picture is to be superposed on a color picture to display a superposed picture, the image pickup conditions such as magnifications, focal points, the image pickup ranges, and orientations of the images of the ultraviolet television camera 34a and the color television camera 34b must match with each other so as to prevent a false signal in a green portion of the picture.

The magnifications of variable magnification lens systems 44a and 44b may be set to be equal to each other to set the magnification of the television camera 34a to be equal to that of the television camera 34b.

The size of a lens barrel 12 is appropriately set in the ultraviolet microscope of FIG. 9 to set the image pickup surfaces of the two television cameras 34a and 34b to be a parfocal position. The ultraviolet microscope shown in FIG. 9 has powered fine adjustment mechanisms 150a and 150b controlled by the controller 46 to match the image pickup ranges and the image orientations of the two television cameras 34a and 34b. The powered fine adjustment mechanisms 150a and 150b are arranged to translate and rotate the television cameras 34a and 34b within the planes perpendicular to the corresponding optical axes.

Figure 13:
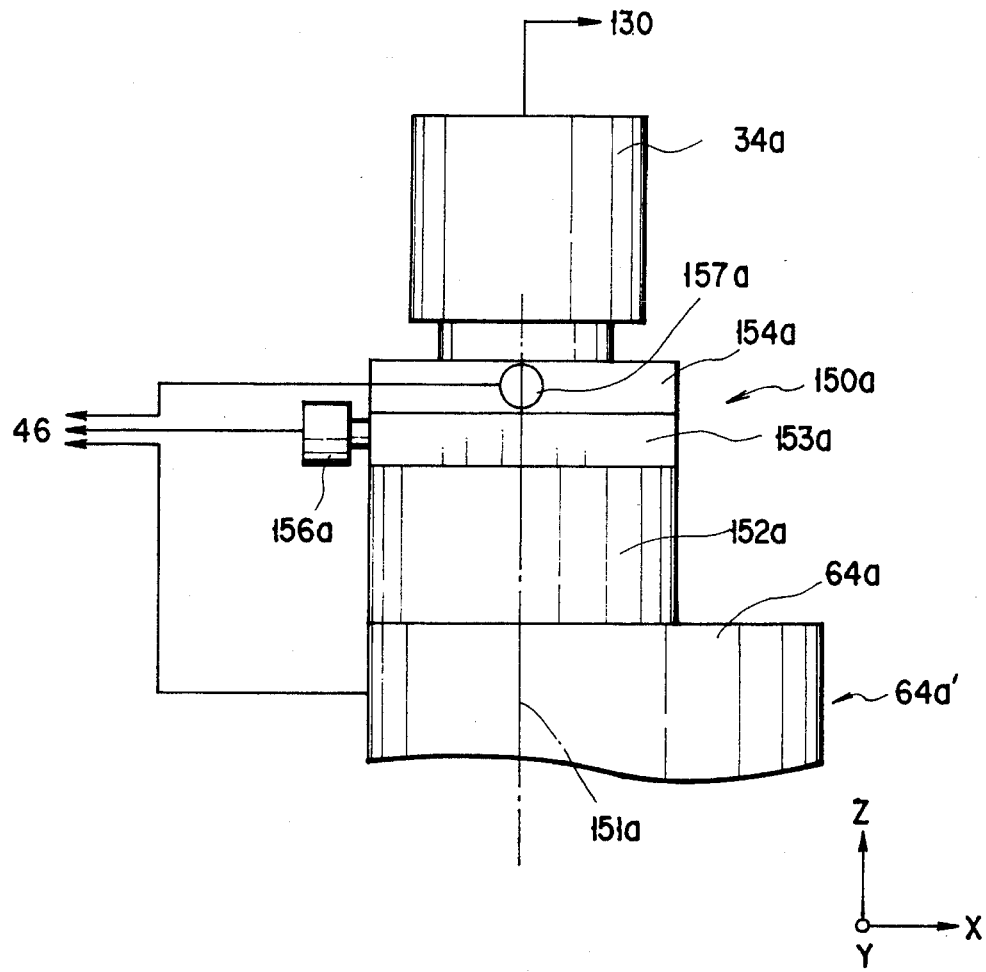
FIG. 13 is a side view of a powered fine adjustment mechanism for one television camera for the ultraviolet microscope shown in FIG. 9.

Referring to FIG. 13, the powered fine adjustment mechanism 150a includes a hollow rotary stage 152a rotatable within the plane perpendicular to an optical axis 151a of the television camera 34a, a hollow X stage 153a mounted on the rotary stage 152a and movable along the X-axis perpendicular to the optical axis 151a (Z-axis), and a hollow Y stage 154a mounted on the X stage 153a and movable along the Y-axis perpendicular to the optical axis 151a and the X-axis. The rotary stage 152a is mounted on a casing 64a' of a turret 64a. The Y stage 154a supports the television camera 34a. The stages 152a, 153a, and 154a are driven by preferably stepping motors controlled by a controller 46. Referring to FIG. 13, X and Y drive stepping motors 156a and 157b are shown, but a rotation drive stepping motor is not illustrated.

A method of adjusting orientation and position of the television camera 34a by the powered fine adjustment mechanism 150a will be described below. Assume that image signal values in the frame memories 137a and 137b in the picture processor 130 are supplied to an internal CPU (not shown) in the controller 46.

A reference specimen 28' shown in FIG. 14 is used in this adjustment method. A reference point P and reference lines x and y perpendicular to each other at the reference point P are drawn on a surface 28a' of the reference specimen 28'. The reference sample 28' is preferably made of a material in which contrast values of the reference lines x and y of an ultraviolet picture should not be different from those of an RGB picture.

The reference specimen 28' is picked up by the television cameras 34a and 34b. The CPU in the controller 46 calculates an inclination difference between the reference lines x and y on the basis of the image signal values stored in the frame memories 137a and 137b in the picture processor 130. The rotary stage 152a is rotated to nullify this difference, thereby adjusting the orientation of the television camera 34a.

Coordinate values of the intersection (reference point P) between the reference lines x and y in the frame memory 137a and the coordinate values of this intersection in the frame memory 137b are calculated, and the X and Y stages 153a and 154a are driven to coincide the coordinate values in the frame memory 137a with those in the frame memory 137b, thereby adjusting the horizontal position of the television camera 34a.

As described above, the orientation and horizontal position of the television camera 34a can be independently adjusted by the powered fine adjustment mechanism 150a. This adjustment operation can be automatically performed by the controller 46, thereby facilitating the adjustment operation.

The arrangement of the powered fine adjustment mechanism 150b for the color television camera 34b is entirely the same as that of the powered fine adjustment mechanism 150a for the ultraviolet television camera 34a. These fine adjustment mechanisms 150a and 150b need not be constituted by a pair of mechanisms. Such a mechanism may be arranged for one of the television cameras 34a and 34b. The shape of the reference specimen 28' need not be limited to the one shown in FIG. 14 if the orientation and deviation of the picture can be calculated.

FIG. 15 shows the eighth embodiment of the present invention. The eighth embodiment is different from the seventh embodiment in that one or a pair of manual fine adjustment mechanisms are arranged in place of the powered fine adjustment mechanisms 150a and 150b. The manual fine adjustment mechanisms for television cameras 34a and 34b are identical to each other, so that only one manual fine adjustment mechanism 160a for the television camera 34a is illustrated in FIG. 15.

The ultraviolet television camera 34a is coaxially fitted in a rotary ring 161a and is fixed by, e.g., a screw (not shown). A holding member 162a has a ring-like upper portion 163a and a frustoconical lower portion 164a. The rotary ring 161a is fitted in the upper portion 163a. The rotary ring 161a is slidable along the fitting surfaces of the rotary ring 161a and the upper portion 163a of the holding member 162a. As a result, the television camera 34a is rotated about its optical axis 151a and the orientation of the television camera 34a can be adjusted. The rotary ring 161a has an annular groove 165a formed along the outer surface thereof. The ring-like upper portion 163a of the holding member 162a has a screw hole 166a corresponding to the groove 165a of the rotary ring 161a. After the orientation of the television camera 34a is adjusted, the sharp distal end of a screw 167a whose the screw shaft is inserted into the screw hole 166a is screwed into the groove 165a of the rotary ring 161a, so that the orientation of the television camera 34a is fixed. The frustoconical lower portion 164a of the holding member 162a is loosely fitted in a camera mounting member 168a mounted on a casing 64a' of a turret 64a of the ultraviolet microscope shown in FIG. 9. The outer surface, i.e., a tapered surface 169a of the frustoconical lower portion 164a abuts against screw-like positioning members 171a threadably engaged with two screw holes 170a of the mounting member 168a. Only one screw hole 170a and one positioning member 171a are illustrated. A ball 174a is elastically urged against a tapered surface 179a by a spring 173a located in an inner recessed portion 172a of the mounting member 168a. The positioning members 171a, the spring 173a, and the ball 174a constitute a positioning mechanism similar to that shown in FIGS. 2 and 3. The television camera 34a is translated within the plane perpendicular to the optical axis 151a by this positioning mechanism, thereby fixing the television camera 34a to a predetermined position. The manual adjustment of the orientation and position of the television camera 34a are performed at the time of installation of the ultraviolet microscope.

FIG. 16 shows the ninth embodiment of the present invention. The same reference numerals as in the first embodiment denote the same parts in the ninth embodiment, unless otherwise specified. An ultraviolet microscope of this embodiment has the important difference from that of the first embodiment in that a target observation range is an ultraviolet range of 400 nm or less and is not applied to observations in a visible range. For this reason, all the lens systems are made of an optical material which can transmit light having a wavelength range of 400 nm or less. In addition, the chromatic aberrations of the image positions and the chromatic aberrations of the magnifications are corrected with respect to the wavelength range of 400 nm or less. An optical member which satisfies the above conditions is, for example, quartz or fluorite.

The ultraviolet microscope shown in FIG. 16 has a dichroic mirror 30e at a position corresponding to the dichroic mirror 30a of the first embodiment. The dichroic mirror 30e reflects an ultraviolet ray having a wavelength of 330 to 400 nm and transmits an ultraviolet ray having a wavelength of less than 330 nm.

A near-ultraviolet image reflected by the dichroic mirror 30e is picked up by an ultraviolet television camera 34a as in the first embodiment. An ultraviolet ray passing through the dichroic mirror 30e is reflected by reflecting mirrors or reflecting prisms 40 and 42 and is picked up by a second ultraviolet television camera 34c. The second ultraviolet television camera 34c has a form coping with the wavelength of less than 330 nm. However, a product identical to the first ultraviolet television camera 34a can be generally used as the second ultraviolet television camera 34c. A picture processor 36c, a display 38c, and a video printer 48c which are connected to the second ultraviolet television camera 34c can be identical to those connected to the first ultraviolet television camera 34a. An enlarged lens system 44c for the second ultraviolet television camera 34c can transmit at least an ultraviolet ray having a wavelength of less than 330 nm. The chromatic aberration of the image position and the chromatic aberration of the magnification are corrected in this wavelength range. A turret 64c for supporting the enlargement lens systems 44c and a shutter 52b located on the incident side of the enlargement lens systems 44c are identical to the turret 64a and the shutter 52b, respectively.

In the ultraviolet microscope shown in FIG. 16, a near-ultraviolet picture can be observed by an observation system on the side of the first ultraviolet television camera 34a, and at the same time, an ultraviolet picture having a wavelength range of less than 330 nm can be observed by an observation system on the side of the second ultraviolet television camera 34c.

FIG. 17 schematically shows an ultraviolet microscope according to the tenth preferred embodiment of the present invention. The same reference numerals as in the sixth and ninth embodiments denote the same parts in the tenth embodiment, unless otherwise specified. Only differences from the sixth embodiment (FIG. 8) will be described below.

The ultraviolet microscope shown in FIG. 17 has a downward incidence illumination system 100 and a transmission illumination system 110 as in the sixth embodiment. However, a target observation range is an ultraviolet range of 400 nm or less.

The materials of all lens systems and chromatic aberration correction are applied to an ultraviolet range of 400 nm or less as in the tenth embodiment.

A light source 18 of the downward incidence illumination system 100 and a light source 112 of the transmission illumination system 110 are light sources capable of emitting ultraviolet rays having wavelengths of 400 nm or less.

Measurement means comprise an ultraviolet television camera 34c coping with the ultraviolet range of 400 nm or less, a display 36c connected to the ultraviolet television camera 34c, and an ultraviolet photographic unit 84 which uses various ultraviolet films having sensitivities for the wavelength range of, e.g., 400 nm or less.

Since an eyepiece system is not used, an optical element denoted by reference numeral 96' is a reflecting mirror.

Half mirrors 26 and 96 on the focusing optical path are ultraviolet half mirrors, respectively.

A stage 122 for holding a specimen 28 is made of a material (e.g., quartz or fluorite) capable of transmitting an ultraviolet ray of 400 nm or less from the transmission illumination system 110.

In the ultraviolet microscope shown in FIG. 17, an ultraviolet image can be picked up by the ultraviolet television camera 34a, and at the same time an ultraviolet image can be picked up by the photographic unit 84.

Alternatively, the half mirror 96 may be replaced with a wavelength selection element (e.g., a dichroic mirror or a dichroic prism) having wavelength selectivity whose threshold value is 330 nm. In this case, an image pickup operation in the near-ultraviolet range can be performed by the ultraviolet television camera 34c, photography in a range except for the range of less than 330 nm can be performed by the photographic unit 84, and vice versa.

The combinations of the magnifications of the objective lenses and enlargement lens systems of the first embodiment, as shown in Table I are applied to the ultraviolet microscopes shown in FIGS. 16 an 17.

The present invention is not limited to the particular embodiments described above. Various changes and modifications may be made within the spirit and scope of the invention. For example, an optical image to be observed is not limited to a bright field image, but can be a dark field image. In each embodiment described above, the image forming lens system comprises an infinity lens system having an objective lens system 22 and a focusing lens system 24 so that a collimated beam is formed between the objective lens system 22 and the focusing lens system 24. However, even if a finite lens system using an objective lens system 22 to focus light is used, this arrangement does not fall outside the scope of the invention. Therefore, various modifications may be made without departing from the spirit or scope of the general inventive concept as defined by the appended claims and their equivalents.

What is claimed is:

1. An ultraviolet microscope comprising:

a stage for holding a specimen to be examined;

light source means for emitting light having a wavelength range from a visible range to a near-ultraviolet range;

an optical lens system including an illumination lens system for illuminating the specimen held on said stage with light emitted from said light source means and an image forming lens system having an objective lens system for focusing an enlarged optical image of the specimen by light from the specimen, at least said illumination lens system and said objective lens system being made of an optical material which can transmit light having at least a wavelength range from the visible range to the near ultraviolet range and which can correct a chromatic aberration of an image position and a chromatic aberration of a magnification with respect to the light having the wavelength range;

first observing means for observing at least an ultraviolet image of the specimen;

second observing means for observing at least a visible image of the specimen; and wherein the image forming lens system has a plurality of said objective lens systems and a plurality of enlargement lens systems, and further comprising controller means for determining and selecting a combination of said objective lens systems and said enlargement lens systems having a highest numerical aperture from among a plurality of combinations having the same total magnification.

2. A microscope according to claim 1, further comprising means for splitting the optical image of the specimen to be formed by said objective lens system into an ultraviolet image and a visible image prior to observations by said first and second observing means.

3. A microscope according to claim 2, wherein said first and second observing means comprise variable magnification lens systems, respectively, having means for correcting a chromatic aberration of an image position and a chromatic aberration of a magnification of said variable magnification system of said first observing means for at least light in a near-ultraviolet range, and for correcting a chromatic aberration of an image position and a chromatic aberration of a magnification of said variable magnification lens system of said second observing means for at least light in a visible range.

4. A microscope according to claim 3, wherein said variable magnification lens system of said first observing means has a magnification different from that of said variable magnification lens system of said second observing means.

5. A microscope according to claim 3, wherein said variable magnification lens systems and said objective lens systems can be combined to variably set a total magnification of said ultraviolet microscope.

6. A microscope according to claim 2, wherein said first observing means comprises ultraviolet image pickup means for causing said first observing means to pickup at least an ultraviolet image and to convert the ultraviolet image into a picture signal, and means for receiving the picture signal from said ultraviolet image pickup means and visually displaying the ultraviolet image.

7. A microscope according to claim 2, wherein said first observing means comprises photographing means for photographing the optical image of the specimen, said photographing means using a photographic film sensitive to at least a near-ultraviolet range.

8. A microscope according to claim 2, wherein said second observing means comprises visible color image pickup means for picking up a visible image and converting the visible image into a color picture signal, and means for receiving the color picture signal from said visible color image pickup means and displaying a color visible image.

9. A microscope according to claim 2, wherein said second observing means comprises an eyepiece system.

10. A microscope according to claim 1, wherein at least one of said plurality of objective lens systems is an infinity objective lens system.

11. A microscope according to claim 1, wherein said image forming lens system includes an infinity objective lens system for diverging light from the specimen, and an infinity focusing lens system for focusing a divergent optical image of the specimen from said infinity objective lens system.

12. A microscope according to claim 1, wherein all lens systems of said image forming lens system are made of an optical material capable of transmitting light having at least a wavelength range from a visible range to a near-ultraviolet range, and chromatic aberrations of an image position and a magnification of each of said all lens systems are corrected with respect to the light having the wavelength range.

13. A microscope according to claim 12, further comprising means for selectively switching an optical path from said image forming lens system into said first observing means or said second observing means.

14. A microscope according to claim 13, wherein said first observing means comprises means for microspectroscopically observing a minute area of the specimen in the wavelength range from the visible range to the near-ultraviolet range.

15. A microscope according to claim 14, wherein said second observing means comprises image pickup means for picking up at least one of a visible image and an ultraviolet image and converting the picked image into a picture signal, and means for receiving the picture signal from said image pickup means and displaying a picture of the specimen.

16. A microscope according to claim 1, wherein said stage comprises means for finely moving the specimen two-dimensionally on an imaginary plane perpendicular to the optical axis of at least one of said plurality of objective lens systems, and means for finely displacing the specimen vertically with respect to said at least one of said objective lens systems such that a focal point of said at least one of said objective lens system is incident on the specimen.

17. An ultraviolet microscope comprising:

a stage for holding a specimen to be examined;

light source means for emitting light having a wavelength range from a visible range to a near-ultraviolet range;

an optical lens system including an illumination lens system for illuminating the specimen held on said stage with light emitted from said light source means and an image forming lens system having an objective lens system for focusing an enlarged optical image of the specimen by light from the object, at least said illumination lens system and said objective lens system being made of an optical material which can transmit light having at least a wavelength range from the visible range to the near-ultraviolet range and which can correct a chromatic aberration of an image position and a chromatic aberration of a magnification with respect to the light having the wavelength range;

means for splitting an optical image of the specimen to be focused by said objective lens system into a visible image and an ultraviolet image;

ultraviolet image pickup means for picking up the ultraviolet image and converting the ultraviolet image into a monochrome picture signal;

visible color image pickup means for picking up the visible image and converting the visible image into a color picture signal;

signal output superposing means for receiving the monochrome picture signal output from said ultraviolet image pickup means and the color picture signal output from said visible color image pickup means and superposing the monochrome picture signal and the color picture signal to output a superposed picture signal;

display means for displaying a pseudo color picture of the specimen on the basis of the superposed picture signal; and means for translating and rotating at least one of said ultraviolet image pickup means and said visible color image pickup means within a plane perpendicular to an optical axis thereof.

18. A microscope according to claim 17, wherein said signal output superposing means comprises:

first storing means for storing a monochrome picture signal and outputting the monochrome picture signal;

second storing means for storing red, green, and blue picture signals contained in a color picture signal and outputting the red, green, and blue picture signals;

converting means for receiving the picture signal from said first storing means and the picture signals from said second storing means, converting the picture signals into red, green, and blue picture signal outputs, and supplying the red, green, and blue picture signal outputs to said display means; and means for synchronizing output timings of said first and second storing means with input timings of said converting means and synchronizing output timings of said converting means with input timings of said display means.

19. An ultraviolet microscope comprising:

a stage for holding a specimen to be examined;

light source means for emitting light having a wavelength range from a visible range to a near-ultraviolet range;

an optical lens system including an illumination lens system for illuminating the specimen held on said stage with light emitted from said light source means and an image forming lens system having a plurality of objective lens systems and a plurality of enlargement lens systems for focusing an enlarged optical image of the specimen by light from the specimen, at least said illumination lens system and said objective lens systems being made of an optical material which can transmit light having at least a wavelength range from the visible range to the near-ultraviolet range and which can correct a chromatic aberration of an image position and a chromatic aberration of a magnification with respect to the light having the wavelength range;

first observing means for observing at least an ultraviolet image of the specimen;

second observing means for observing at least a visible image of the specimen, said optical material comprising i-ray glass located in an optical path common to the first and second observing means, thereby permitting light having the wavelength range from the visible range to the near-ultraviolet range to be focused simultaneously; and controller means for determining and selecting a combination of said objective lens systems and said enlargement lens systems having a highest numerical aperture from among a plurality of combinations having the same total magnification.

* * * * *